(12) United States Patent
Hashimoto et al.

(10) Patent No.: US 7,577,123 B2
(45) Date of Patent: Aug. 18, 2009

(54) PACKET TRANSMISSION METHOD AND SYSTEM, BASE STATION, WIRELESS LAN TERMINAL, AND WIRELESS LAN SYSTEM USING THE SAME

(75) Inventors: Naoki Hashimoto, Kanagawa (JP); Yoshikazu Kobayashi, Kanagawa (JP)

(73) Assignee: NEC Infrontia Corporation, Kanagawa (JP)

( * ) Notice: Subject to any disclaimer, the term of this patent is extended or adjusted under 35 U.S.C. 154(b) by 952 days.

(21) Appl. No.: 10/653,926

(22) Filed: Sep. 4, 2003

(65) Prior Publication Data

US 2004/0066763 A1 Apr. 8, 2004

(30) Foreign Application Priority Data

Sep. 30, 2002 (JP) ............................. 2002-286349

(51) Int. Cl.
  *H04W 4/00* (2009.01)
  *H04J 3/24* (2006.01)
  *H04L 12/28* (2006.01)
  *H04B 1/38* (2006.01)
(52) U.S. Cl. .................. 370/338; 370/328; 370/349; 370/395.42; 455/561
(58) Field of Classification Search ......... 455/423–425, 455/452.2, 445, 462–463, 550.1, 560–561, 455/556.2, 557–559, 41.2, 403, 466, 418–420, 455/422.1, 512–514, 517, 426.2; 370/395.4–395.42, 370/395.3, 395.21, 395.52, 395.53, 395.64, 370/444, 912, 908, 911, 338, 313–315, 326, 370/328–329, 335–336, 341–345, 349, 352–357, 370/394, 395.43, 455, 473–474, 902
See application file for complete search history.

(56) References Cited

U.S. PATENT DOCUMENTS 5,757,801 A * 5/1998 Arimilli ...................... 370/444

(Continued)

FOREIGN PATENT DOCUMENTS

EP 1053830 A1 12/2000

(Continued)

OTHER PUBLICATIONS

"Scheme for Supporting Voice over IEEE 802.11 Wireless Local Area Network" Proc. Natl. Sci. Counc. Roc (A) 'Online ! vol. 25, No. 4, 2001, pp. 259-268, XP002265313.

*Primary Examiner*—Meless N Zewdu
(74) *Attorney, Agent, or Firm*—Sughrue Mion, PLLC

(57) ABSTRACT

Disclosed herein is a packet transmission method wherein received packets are sorted into prioritized QoS packets and general packets other than the prioritized QoS packets, the sorted prioritized QoS packets are accumulated, the accumulated QoS packets are capsulated and then transmitted as a capsulated packet, and the capsulated packet is transmitted in matching with the period of a CODEC. In the preferred embodiment, there is provided a wireless LAN system comprising a base station and at least one wireless LAN terminal connected to said base station via a wireless LAN; and a packet transmission system for transmitting a packet between said base station and said at least one wireless LAN terminal via the wireless LAN, the packet transmission system. In the packet transmission system, a packet sorter sorts received packet into prioritized packets and packets other than the prioritized packets. A FIFO queue buffer (QoS queue) accumulates the sorted prioritized packets. A packet combiner capsulates the accumulated packets in the QoS queue. A wireless packet transmitter transmits the capsulated packet between the base station and the at least one wireless LAN.

25 Claims, 14 Drawing Sheets

U.S. PATENT DOCUMENTS

| | | | |
|---|---|---|---|
| 5,987,518 A | 11/1999 | Gotwald | |
| 6,078,566 A * | 6/2000 | Kikinis | 370/286 |
| 6,262,797 B1 * | 7/2001 | Horikawa | 355/53 |
| 6,490,629 B1 * | 12/2002 | Milliken et al. | 709/232 |
| 6,529,519 B1 * | 3/2003 | Stiener et al. | 370/412 |
| 6,609,316 B2 * | 8/2003 | Ohba et al. | 370/395.42 |
| 6,747,968 B1 * | 6/2004 | Seppala et al. | 370/338 |
| 6,963,575 B1 * | 11/2005 | Sistanizadeh et al. | 370/404 |
| 6,977,896 B1 * | 12/2005 | Kobayashi | 370/235 |
| 7,050,452 B2 * | 5/2006 | Sugar et al. | 370/465 |
| 2003/0031151 A1 * | 2/2003 | Sharma et al. | 370/338 |
| 2004/0003094 A1 * | 1/2004 | See | 709/227 |
| 2005/0068924 A1 * | 3/2005 | Lindskog et al. | 370/338 |

FOREIGN PATENT DOCUMENTS

| | | |
|---|---|---|
| JP | 11-177563 A | 7/1999 |
| JP | 11-298528 A | 10/1999 |
| JP | 2000-156693 A | 6/2000 |
| JP | 2001-16226 A | 1/2001 |
| JP | 2001-45064 A | 2/2001 |
| JP | 2002-199010 A | 7/2002 |
| JP | 2002-217971 A | 8/2002 |
| WO | WO 01/50705 A2 | 7/2001 |

* cited by examiner

FIG.8

PACKET TRANSMISSION METHOD AND SYSTEM, BASE STATION, WIRELESS LAN TERMINAL, AND WIRELESS LAN SYSTEM USING THE SAME

BACKGROUND OF THE INVENTION

1. Field of the Invention

The present invention relates to a packet transmission method and system for transmitting received packets, and a base station, a wireless LAN (Local Area Network) terminal, and a wireless LAN system using the same.

2. Description of the Related Art

FIG. 14 is a block diagram showing a configuration of a wireless LAN system according to a prior art example. Real time communication such as VoIP (Voice on Internet Protocol) via a conventional wireless LAN will be explained with reference to FIG. 14. In FIG. 14, terminals 1301, 1302, . . . , 130N respectively have a CODEC (COder-DECoder) and a network interface for transmitting and receiving packets 1, 2, . . . , N for data communication and real time communication. A network 1310 consists of Internet or a LAN or the like capable of IP (Internet Protocol) communication and transmits data packets and RTP (Real Time Protocol) packets.

Packets 1311 (packets 1, 2, . . . , N) correspond to RTP packets transmitted from the terminals 1301, 1302, . . . , 130N and transfer media data such as voice, moving pictures to individual destinations. A base station 1320 bridges the packets 1311 (RTP packets) transmitted through the network 1310 to a wireless LAN. Wireless LAN packets 1321, 1322, . . . , 132N comprise wireless LAN headers and payloads 1, 2, . . . , N respectively, and correspond to RTP packets bridged to the wireless LAN and transfer real-time communication data such as voice, moving pictures to wireless LAN terminals 1331, 1332, . . . , 133N. The wireless LAN terminals 1331, 1332, . . . , 133N decode the received wireless LAN packets 1321, 1322, . . . , 132N (RTP packets) to reproduce the media data such as voice, moving pictures respectively.

SUMMARY OF THE INVENTION

However, the real time communication such as the VoIP via the conventional wireless LAN had the following problems. That is, since the wireless LAN headers were large and the RTP packets were of short packets, the original transmission rate could not be utilized. Since there was no matching between communication timing of the wireless LAN and the period of a CODEC, the efficient transmission of packets could not be carried out.

The present invention has been made in view of the conventional problems, and an object of the present invention is therefore to provide a packet transmission method and system capable of taking advantage of the original transmission rate and transmitting packets with efficiency, a base station equipment, a wireless LAN terminal equipment and a wireless LAN system each of which makes use of the packet transmission method and system.

In order to attain the above object, according to one aspect of the present invention, there is provided a packet transmission method comprising the steps of sorting received packets into prioritized packets and packets other than the prioritized packets, and transmitting the sorted prioritized packets.

According to another aspect of the present invention, there is provided a packet transmission method comprising the steps of sorting received packets into prioritized packets and packets other than the prioritized packets, accumulating the sorted prioritized packets, capsulating the accumulated packets, and transmitting the so-capsulated packet.

According to a further aspect of the present invention, there is provided a packet transmission system comprising sorting means for sorting received packets into prioritized packets and packets other than the prioritized packets, and transmitting means for transmitting the prioritized packets sorted by the sorting means.

According to a yet another aspect of the present invention, there is provided a packet transmission system comprising sorting means for sorting received packets into prioritized packets and packets other than the prioritized packets, accumulating means for accumulating the prioritized packets sorted by the sorting means, capsulating means for capsulating the packets accumulated in the accumulating means, and transmitting means for transmitting the packet capsulated by the capsulating means.

According to a still further aspect of the present invention, there is provided a base station equipment including the above packet transmission system.

According to a still further aspect of the present invention, there is provided a wireless LAN terminal equipment including the above packet transmission system.

According to a still further aspect of the present invention, there is provided a wireless LAN system comprising the above base station equipment, and the above wireless LAN terminal equipment.

According to a still further aspect of the present invention, there is provided a wireless LAN system comprising the above base station equipment, the above wireless LAN terminal equipment connected to the base station equipment via a wireless LAN, and arbitrating means for transmitting delay request information for delaying transmission of packets from the base station equipment to the wireless LAN terminal equipment such that the packet transmission does not overlap with other terminals thereby to arbitrate transmission of packets from the wireless LAN terminal equipment to the base station equipment so as not to cause a collision thereof.

According to a still further aspect of the present invention, there is provided a wireless LAN system comprising the above base station equipment, and the above wireless LAN terminal equipment connected to the base station equipment via a wireless LAN, wherein the wireless LAN terminal equipment is associated with a PCF mode, and the base station equipment sets a NAV time and gives timing provided to transmit a capsulated packet, to the wireless LAN terminal equipment.

According to a still further aspect of the present invention, there is provided a wireless LAN system comprising the above base station equipment, and the above wireless LAN terminal equipment connected to the base station equipment via a wireless LAN, and means for adjusting a period for transmitting a capsulated packet according to the number of real time sessions active via the base station equipment.

According to a still further aspect of the present invention, there is provided a wireless LAN system comprising the above base station equipments, the above wireless LAN terminal equipments respectively connected to the base station equipments via a wireless LAN, and means for collecting CODEC minimal periods corresponding to the number of the wireless LAN terminal equipments set every above base station equipments and adjusting the longest CODEC period of the resultant minimal periods as a transmission period of each capsulated packet.

According to a still further aspect of the present invention, there is provided a wireless LAN system comprising an IP exchanger having the above packet transmission system, the above base station equipments connected to the IP exchanger, the above wireless LAN terminal equipments respectively connected to the base station equipments via a wireless LAN, a table in which IP addresses of the wireless LAN terminal equipments connected every above base station equipments and information indicative of whether the wireless LAN terminal equipments are able to receive capsulated packets are registered, and means for performing control for, when transmit destination IP addresses of received packets respectively correspond to IP addresses of the wireless LAN terminal equipments and the wireless LAN terminal equipment are respectively able to receive the capsulated packets, allowing the IP exchanger to capsulate prioritized packets, based on the information registered in the table and causing the IP exchanger to transmit the so-capsulated packet, and allowing the IP exchanger to transmit the received packets to the base station equipments as they are if not so.

According to a still further aspect of the present invention, there is provided a wireless LAN system comprising the above base station equipment, the above wireless LAN terminal equipment connected to the base station equipment via a wireless LAN, arithmetic means for computing use efficiency of a general queue for accumulating general packets other than prioritized capsules, using a predetermined arithmetic expression, and control means for changing coefficients of the arithmetic expression according to the state of accumulation of the general queue to thereby control the value of the use efficiency computed by the arithmetic means.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 8 is a diagram showing a packet transmission sequence of a fifth embodiment of the present invention;

DETAILED DESCRIPTION OF THE INVENTION

Preferred embodiments of the present invention will next be described in detail with reference to the accompanying drawings. In the following embodiments, there is provided a packet transmission system having a wireless LAN base station and wireless LAN terminals connected to the station via a wireless LAN. Each of the terminals has CODEC (COder-DECoder) module (hereinafter called "CODEC") composed of software or hardware for converting analogy signals such as voice, moving pictures into digital form, compressing and expanding or decompressing the same in order to perform real time communication. The system is intended to improve the efficiency of transmission of a RTP (Real Time Protocol) packet and ensure QoS (Quality of Service) of the real time communication, and increase an allowable number of communications while compressing the number of packets on the wireless LAN, matching between the transmission period of each packet and the period time of the CODEC, and holding communications of each normal LAN packet (hereinafter called a "general packet").

First Embodiment

Figure 1:
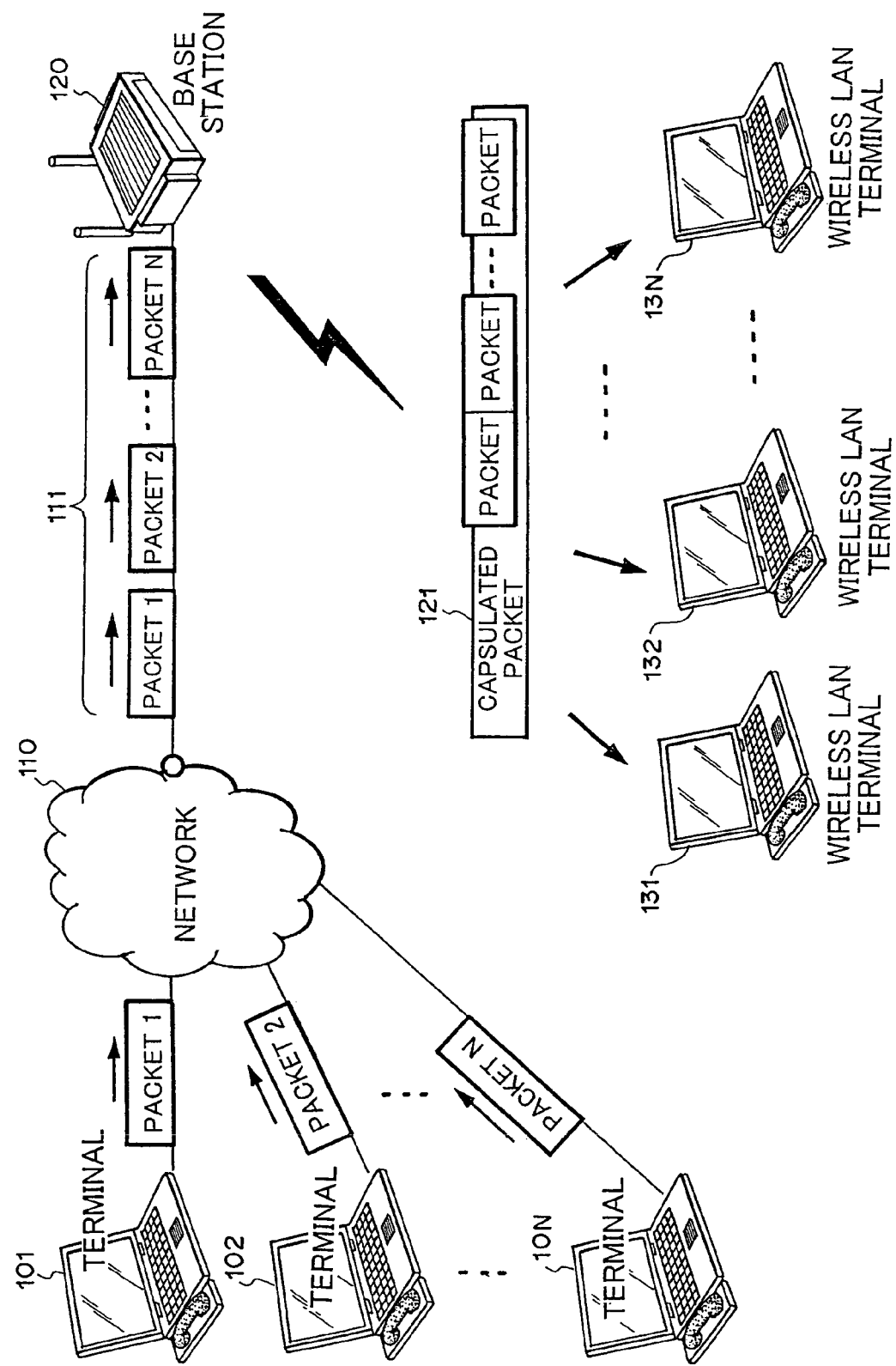
FIG. 1 is a configuration diagram showing a first embodiment of the present invention.

FIG. 1 is a block diagram showing a first embodiment of the present invention. In FIG. 1, terminals $101, 102, \ldots, 10N$ respectively have CODECs and network interfaces and transmit and receive packets $1, 2, \ldots, N$ for data communication and real time communication. A network 110 comprises Internet or a LAN or the like, which is capable of IP communication and transmits RTP packets and general packets.

Packets 111 (packets $1, 2, \ldots, N$) are RTP packets transmitted from the terminals $101, 102, \ldots, 10N$ and transfer media data such as voice, moving pictures to individual destinations. A base station 120 includes QoS queues (refer to a subsequent description) that accumulate the packets 111 (RTP packets) transmitted from the network 110 and process the same on a priority basis, and an interval timer (refer to a subsequent description) that counts a period T obtained in the following expression (1) with respect to the period C of the CODEC used for generation of RTP packets. A period d in the following expression (1) indicates the minimum interval for avoiding interference with the reception of each terminal.

$$d \leq T \leq C \tag{1}$$

The base station 120 capsulates the received packets 111 (RTP packets) accumulated at intervals of the period T as denoted by a packet 121 and sends out the packet (hereinafter called a capsulated packet") 121 to a communication channel on the wireless LAN with the timing of the period T. Particularly when small packets like voice RTP packets are periodically sent one by one, the RTP packets of each session are combined into one, which in turn is transmitted as a broadcast or multicast capsulated packet 121 (hereinafter called "broadcast capsulated packet") in a mode requiring no ACK reply.

Each of wireless LAN terminals $131, 132, \ldots, 13N$ has the mechanism of extracting a LAN packet addressed thereto from the broadcast capsulated packet 121 sent from the base station 120, and decodes the extracted RTP packet to reproduce or play back media data such as voice, moving pictures. In the present embodiment as described above, the RTP packets are transmitted with timing matched with the period of the CODEC while compressing the number of the packets transmitted over the wireless LAN.

In general, a header section in the wireless LAN packet is large in band consumption. In IEEE802.11b, for example, the header section is modulated with 1 Mbps. Converting to 11 Mbs results in one equivalent to more than or equal to 256 bytes. In contrast, the RTP packet results in a relatively small packet. When a voice of 10 ms is coded on the basis of G. 729, for example, a payload is no more than 10 bytes, thus resulting in one-twentieth of the wireless LAN packet.

Further, a UDP (User Datagram Protocol) is applied to each RTP session using the RTP packet. Since the ACK reply occurs in a unicast on the wireless LAN, its header also presses the band. Thus when a large number of RTP sessions are developed or broadcasted through the wireless LAN, the transmission and reception of a short packet frequently occur and hence its header increases markedly in band consumption, so that the quality of voice and moving pictures is degraded.

The present embodiment improves such a point, compresses the number of packets on the wireless LAN and matches between the packet transmission period and the period of CODEC to enhance the efficiency of transmission, thereby making it possible to improve the communication quality of voice and moving pictures or the like and the number of simultaneous communications in real time communication even under wireless LAN environments utilized by a large number of terminals such as offices, hot spots.

Figure 2:
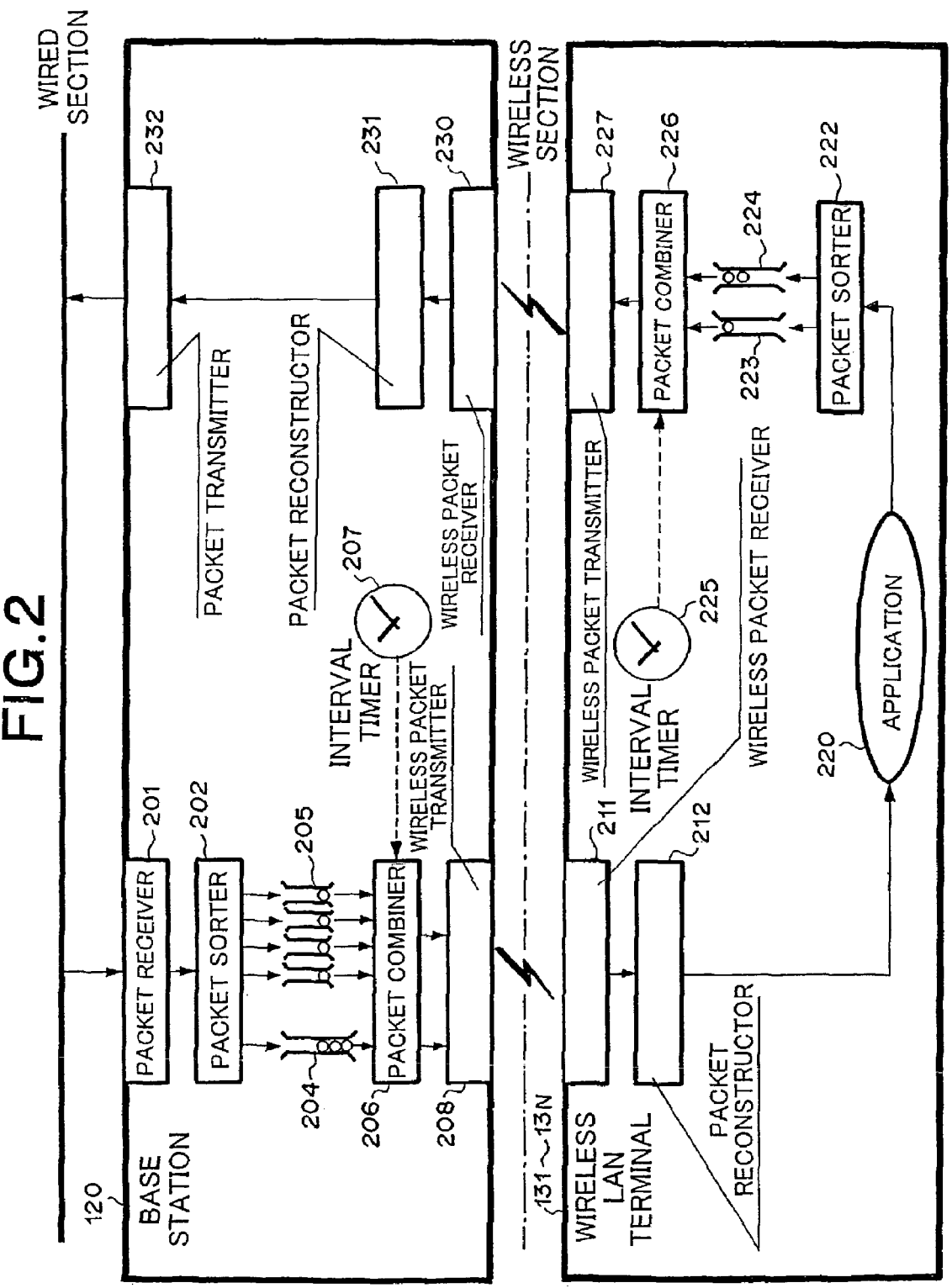
FIG. 2 is a configuration diagram illustrating a base station and a wireless LAN terminal of FIG. 1 in detail.

FIG. 2 is a block diagram showing the base station 120 and wireless LAN terminals 131 through 13N of FIG. 1 in detail. In FIG. 2, a packet receiver 201 in the base station 120 receives packets from the network 110. A packet sorter 202 refers to headers of the received packets and sort them into prioritized packets (hereinafter called "QoS packets") and general packets other than those.

A method of sorting the packets by the packet sorter 202 will be described later in detail. A FIFO (First-In First-Out) queue buffer (hereinafter called general queue) 204 for the general packets temporarily accumulates the unprioritized packets therein. FIFO queue buffers (hereinafter called "QoS queues") 205 for the QoS packets temporarily accumulate the prioritized packets therein.

A packet combiner 206 capsulates the packets accumulated in the QoS queues 205 in preference to the packets accumulated in the general queue 204. An interval timer 207 measures time of the period T (refer to the expression (1)) for providing timing to generate the capsulated packet. A wireless packet transmitter 208 transmits the general packets and capsulated packet to a wireless section.

A wireless packet receiver 211 in each of the wireless LAN terminals 131 through 13N receives wireless packets from the base station 120. When a packet reconstructor 212 receives the capsulated packet therein, it extracts and reconstructs the corresponding packet addressed thereto from within the capsulated packet. An application 220 performs real time communication through the use of the CODEC in addition to the normal transmission of data.

A packet sorter 222 refers to the packets required to be transmitted from the application 220 and sorts them into the QoS packets and general packets. The packet sorter 222 performs sorting of the QoS packets and general packets in a manner similar to the packet sorter 202.

A QoS queue 223 temporarily accumulates the QoS packets therein. A general queue 224 temporarily accumulates the general packets therein. An interval timer 225 ticks the period T (see the expression (1) referred to above). A packet combiner 226 is capable of capsulating the packets accumulated in the QoS queue 223 in preference to the packets accumulated in the general queue 224. A wireless packet transmitter 227 transmits the normal packets and capsulated packet to the wiring section.

A wireless packet receiver 230 in the base station 120 receives a wireless LAN packet therein. When a packet reconstructor 231 receives the capsulated packet, it extracts and reconstructs all of the packets contained therein. A packet transmitter 232 transmits the packets to the network 110.

Here, the QoS queues 205 in the base station 120 are divided every MAC (Media Access Control) addresses, IP addresses or IP ports. In case of need, the QoS queues 205 are further divided every types of RTP packets, and the packets are read in preference to the general queue 204 in principle. When the packet combiner 206 processes short packets that periodically arrive one by one as in the case of the voice RTP packets, it may capsulate the RTP packets for respective destinations, combine the broadcast or multicast capsulated packets and control the wireless packet transmitter 208 to synchronize the interval between radio beacons with the period T.

Alternatively when it is desired to process short packets that arrive in large numbers periodically with respect to one destination as in the case of RTP packets of moving pictures, the packet combiner 206 may capsulate only the RTP packets for the destination and combine unicast capsulated packets. Also the packet combiner 206 may pass long packets ineffective for capsulation, as they are without capsulating them. This is similar even to the general queues. The packet combiner 206 delivers both capsulated packets and normal packets to the packet transmitter 208 according to cases. On the other hand, since the destination for each wireless packet is directed only to the base station 120, the packet combiners 226 in the wireless LAN terminals 131 through 13N always handle the capsulated packets as unicasts.

Incidentally, while the general queue 204 in the base station 120 is provided collectively as one in the present embodiment, the general queue 204 may be divided every destination MAC addresses. Timings provided for the radio beacons may be used as the timings provided to generate the capsulated packets by the respective interval timers 207 and 225 of the base station 120 and the wireless LAN terminals 131 through 13N.

A description will next be made of the operation of transmitting packets between the base station 120 and each of the wireless LAN terminals 131 through 13N in FIG. 2. When the packets are first supplied from the packet receiver 201 to the packet sorter 202 in the base station 120, the packet sorter 202 sorts the packets according to a method to be described later. If they are found to be general packets, then the packet sorter 202 supplies the packets to the general queue 204. If they are found to be QoS packets at the existing QoS session, then the packet sorter 202 supplies the packets to the QoS queues 205. If they are judged to be QoS packets at a new QoS session, then the packet sorter 202 creates a new queue buffer within the QoS queues 205 and supplies the packets thereto.

The interval timer 207 has already counted the period T. When timing is supplied from the interval timer 207 to the packet combiner 206, the packet combiner 206 takes out the packets from the general queue 204 and the QoS queues 205 on a QoS packet priority basis and capsulates them, followed by supply to the wireless packet transmitter 208. Incidentally, since their capsulation is ineffective where they are long packets even in the case of the QoS packets, the packet combiner 206 may not capsulate them.

On the other hand, when each packet sent from the wireless packet transmitter 208 is received by each of the wireless LAN receivers 211 in the wireless LAN terminals 131 through 13N, and the received packet is supplied from the wireless packet receiver 211 to the packet reconstructor 212, the packet reconstructor 212 makes a decision as to whether the packet is a capsulated packet. If the packet is found to be a general packet at this time, then the packet reconstructor 212 supplies the packet to the application 220. If the packet is found to be the capsulated packet, then the packet reconstructor 212 determines whether it is a broadcast packet. If it is found to be a unicast packet, then the packet reconstructor 212 reconstructs all the packets with which the unicast packet is packaged, and supplies them to the application 220. If it is found to be a broadcast packet, then the packet reconstructor 212 determines destinations for packets with which the broadcast packet is packaged. If the packet addressed to the packet reconstructor 212 exists therein, then the packet reconstructor 212 reconstructs the packet and supplies it to the application 220.

Next, when the packet is supplied from the application 220 to the packet sorter 222, the packet sorter 222 similarly performs a decision as to the packet. If the packet is found to be a general packet, then the packet sorter 222 supplies it to the general queue 224. If the packet is found to be a QoS packet, then the packet sorter 222 supplies it to the QoS queue 223.

The interval timer 225 has already counted the period T. When timing is supplied from the interval timer 225 to the packet combiner 226, the packet combiner 226 takes out the packets from the general queue 224 and the QoS queue 223 on a QoS packet priority basis and capsulates them, followed by supply to the wireless packet transmitter 227. Since, even at this time, there is no effect on their capsulation where they are long packets, the packet combiner 226 may not capsulate them.

When the corresponding packet received from the wireless packet transmitter 227 is supplied from the wireless packet receiver 230 to the packet reconstructor 231 in the base station 120, the packet reconstructor 231 determines whether it is of a capsulated packet. If the packet is found to be a general packet, then the packet reconstructor 231 supplies the packet to the packet transmitter 232. If the packet is found to be of the capsulated packet, then the packet reconstructor 231 reconstructs all the packets with which the capsulated packet is packaged, and supplies them to the packet transmitter 232.

Figure 3:
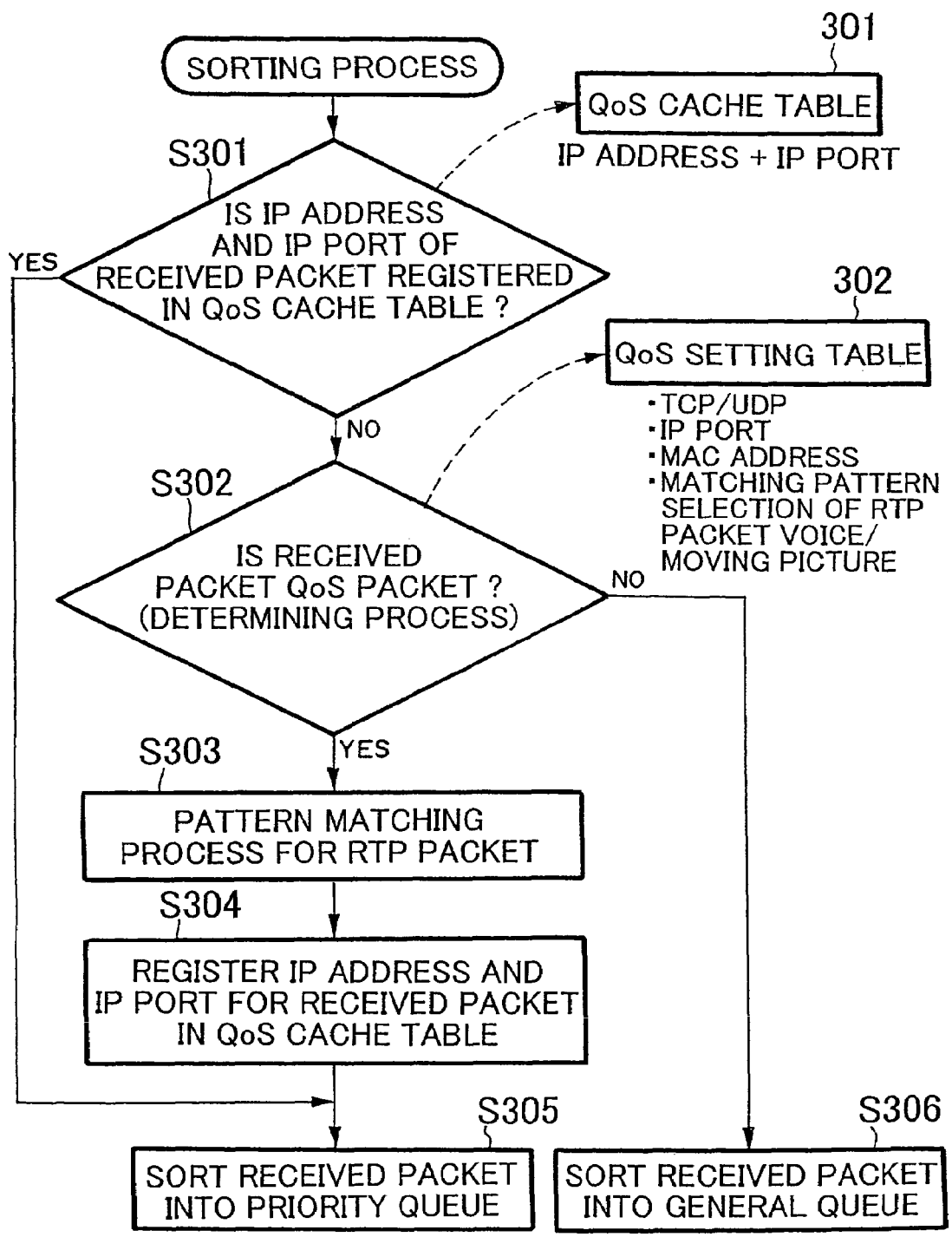
FIG. 3 is a flowchart depicting one example of a method of sorting packets by packet sorters employed in the first embodiment.

A method of sorting packets by the packet sorters 202 and 222 in the base station 120 and the wireless LAN terminals 131 through 13N will next be explained. FIG. 3 is a flowchart showing one example of a packet sorting process to be executed by each of the packet sorters 202 and 222. Incidentally, as will be descried later, the packet sorters 202 and 222 have a QoS cache table 301 and a QoS setting table 302 therein respectively in the present embodiment. Each of the packet sorters 202 and 222 performs a process for sorting received packets into QoS packets and general packets by using the two tables 301 and 302.

In FIG. 3, when the packet sorters 202 and 222 first receive packets, they refer to the QoS table 301 and determine whether the received packets have been registered therein (Step S301). That is, IP addresses and IP ports for packets have been registered in the QoS cache table 301. When the IP addresses and IP ports of headers for the received packets have been registered therein, the packet sorters 202 and 222 determine that the received packets have been registered in the QoS cache table 301. Incidentally, the QoS cache table 301 is empty in its initial state. In this case, the packet sorters 202 and 222 judge that the packets have not been registered.

Figure 4:
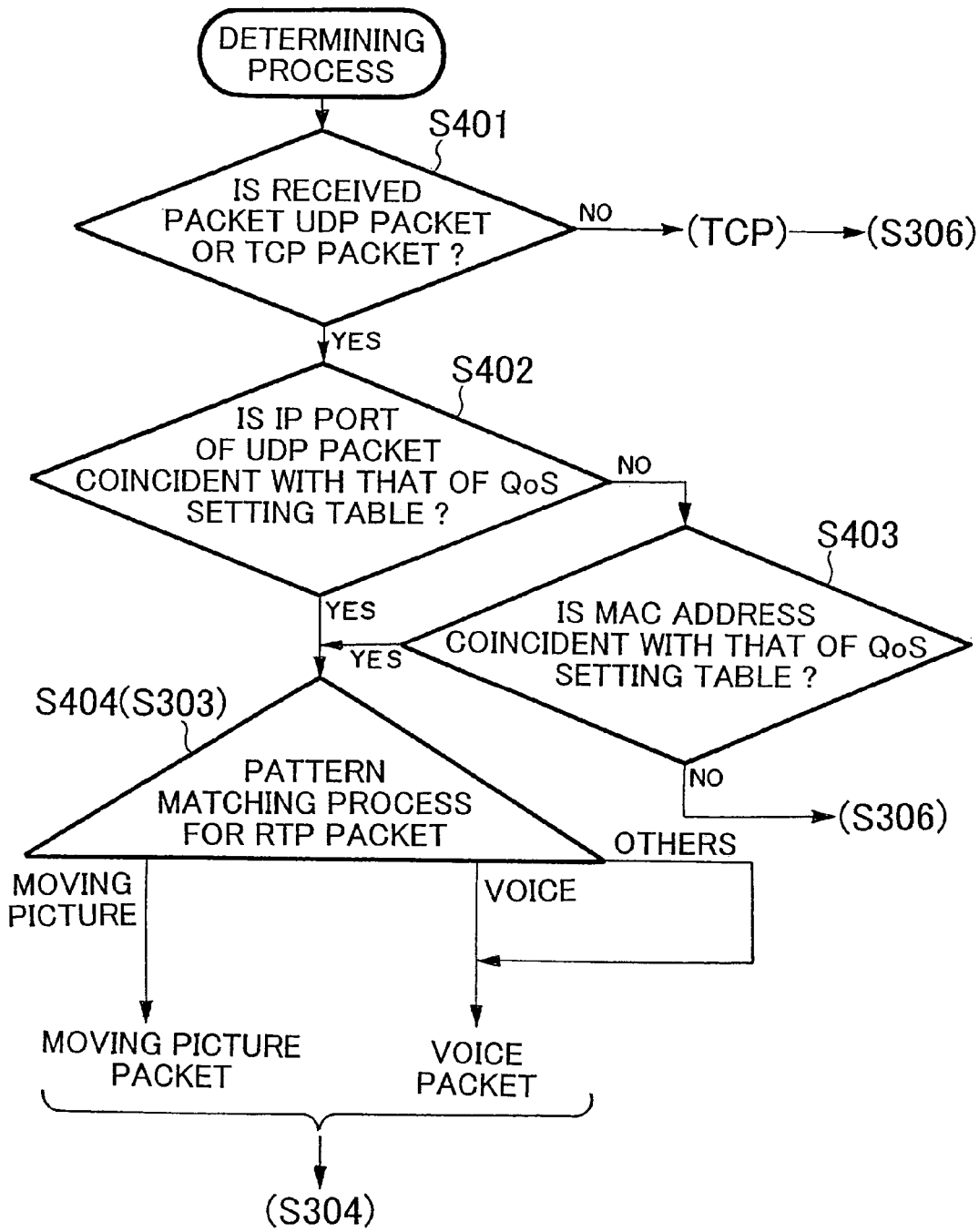
FIG. 4 is a flowchart showing a setting process of FIG. 3 in detail.

Next, the packet sorters 202 and 222 respectively perform a setting process using the QoS setting table 302 (Step S302). FIG. 4 is a flowchart showing the process of Step S302 in detail. Incidentally, TCP(Transmission Control Protocol)/UDP(User Datagram Protocol) patterns of packets, IP ports thereof, MAC addresses thereof, voice, moving picture patterns, etc. have been registered in the QoS setting table 302. First, the packet sorters 202 and 222 refer to headers (headers for layer 4) of received packets and check the same against the TCP/UDP patterns registered in the QoS setting table 302 to thereby determine whether the received packets are TCP or UDP (Step S401).

When the received packets are found to be TCP at Step S401, the packet sorters 202 and 222 proceed to Step S306 in FIG. 3, where they determine that the received packets are of general packets. Then the packet sorters 202 and 222 respectively sort them into the general queues 204 and 224 and terminate the packet sorting process. On the other hand, when the received packets are found to be UDP at Step S401, the packet sorters 202 and 222 refer to UDP headers of the received packets and determine whether IP ports at the headers respectively coincide with the IP ports registered in the QoS setting table 302 (Step S402).

When they are found not to coincide with the IP ports at this time, the packet sorters 202 and 222 refer to headers (headers for layer 2) of received packets and thereby determine whether MAC addresses thereof have been registered in the QoS setting table 302 (Step S403). When the MAC addresses are found not to have been registered therein, the packet sorters 202 and 222 determine at Step S306 in FIG. 3 that the received packets are general packets. Then the packet sorters 202 and 222 respectively sort the general packets into the general queues 204 and 224 and terminate the packet sorting process. When the MAC addresses are found to have been registered therein, the packet sorters 202 and 222 proceed to Step S404 where they perform a pattern matching process. The present Step S404 is however a process executed in embodiments to be described later, where prioritized packets are further sorted into moving pictures and voice packets (Step S404 in FIG. 4 corresponds to Step S303 in FIG. 3).

Thus, in the present embodiment, when the answer is YES at Step S402 and the answer is YES at Step S403, the packet sorters 202 and 222 perform the pattern matching process (Step S404 of FIG. 4 and Step. S303 of FIG. 3) and further sort the prioritized packets into moving picture packets and voice packets. Thereafter, the packet sorters 202 and 222 proceed to Step S304, where the IP addresses and IP ports of the received packets are registered in the QoS cache table 301. Afterwards, the packet sorters 202 and 222 sort the received packets into the priority queues 205 and 223 as the prioritized packets (Step S305). Each time the packet sorters 202 and 222 receive packets, they respectively perform the processes shown in FIGS. 3 and 4 and sort the received packets into the prioritized packets and general packets.

Second Embodiment

A second embodiment of the present invention will next be explained. The present embodiment is designed so as not to cause trouble in real time communication even when overload is imposed on packet transmission. Incidentally, the present embodiment is similar to FIGS. 1 and 2 illustrative of the first embodiment in respect to a system configuration and configurations of a base station and wireless LAN terminals.

Figure 5:
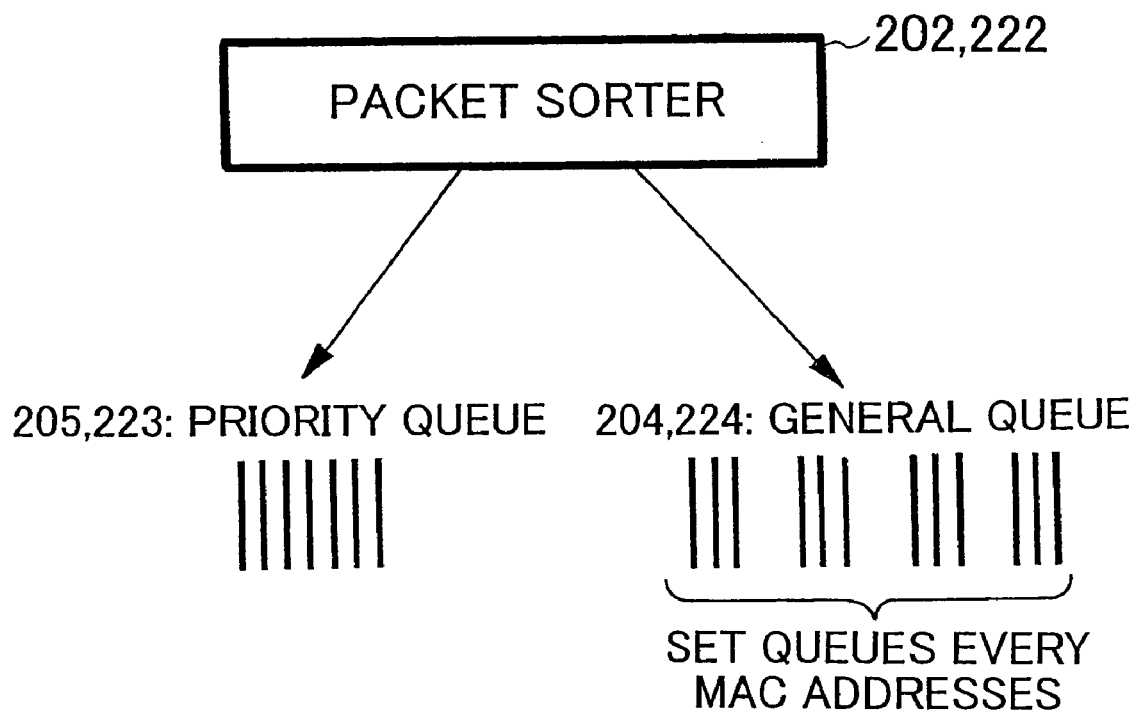
FIG. 5 is a diagram illustrating a second embodiment of the present invention.

In the present embodiment, packet sorters 202 and 222 respectively set queues every MAC addresses as to general queues 204 and 224 as shown in FIG. 5. Thus, since the general queues 204 and 224 are queued every MAC addresses, there is no harm in transmitting packets even if the packet transmission to other terminals is congested.

Third Embodiment

Figure 6:
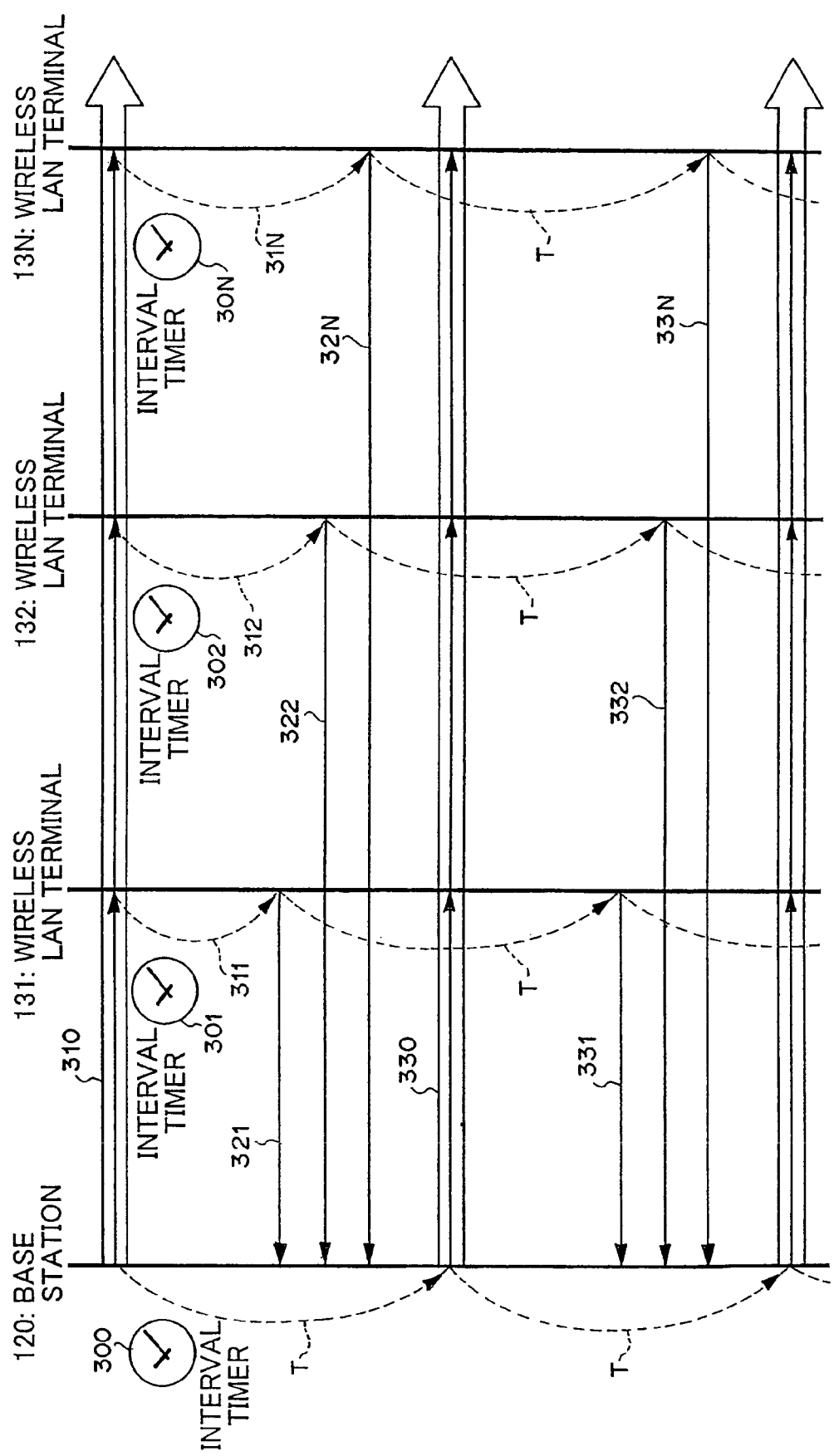
FIG. 6 is a timing chart for describing a third embodiment of the present invention.

A third embodiment of the present invention will next be explained. Although a system configuration and basic configurations of a base station and wireless LAN terminals in the third embodiment are similar to FIGS. 1 and 2 illustrative of the first embodiment, the third embodiment is further contriving the transmission of packets from the wireless LAN terminals to the base station. FIG. 6 shows a timing chart thereof.

In FIG. 6, an interval timer 300 of a base station 120 counts the period T taken to transmit a capsulated packet from the base station 120 to wireless LAN terminals 131, 132, . . . , 13N. Interval timers 301, 302, . . . , 30N of the wireless LAN terminals 131, 132, . . . , 13N respectively counts timings provided to transmit capsulated packets from the wireless LAN terminals 131, 132, . . . , 13N to the base station 120.

A broadcast capsulated packet 310 from the base station 120 to the wireless LAN terminals 131, 132, . . . , 13N is packaged with packets to be transmitted to the terminals 131, 132, . . . , 13N and delay request information to the terminals 131, 132, . . . , 13N. Designated at numerals 311, 312, . . . , 31N are transmission delay times after the terminals respectively have received the delay request information. Designated at numerals 321, 322, . . . , 32N are packets transmitted from the terminals 131, 132, . . . , 13N to the base station 120 after the terminals respectively have received the broadcast capsulated packet 310.

Although a broadcast capsulated packet 330 transmitted from the base station 120 to the wireless LAN terminals 131, 132, . . . , 13N is packaged with packets transmitted to the terminals 131, 132, . . . , 13N, it does not contain delay request information. Designated at numerals 331, 332, . . . , 33N are packets transmitted from the wireless LAN terminals 131, 132, . . . , 13N to the base station 120 after the terminals respectively have received the broadcast capsulated packet 330. When a large number of the terminals 131, 132, . . . , 13N are performing real time communication under one base station 120, the efficiency of transmission of the packets from the base station 120 to the terminals 131, 132, . . . , 13N can be enhanced by compressing the number of packets through the use of the broadcast capsulated packets.

However, in the case of a distributed coordination type DCF (Distributed Coordination Function) that has been widely used, the transmission of the packets from the wireless LAN terminals 131, 132, . . . , 13N to the base station 120 is apt to frequently produce a packet collision and cause the loss of transmission.

In the present embodiment, when the base station 120 has recognized the beginning of a session with the wireless LAN terminals 131, 132, . . . , 13N, the base station 120 allocates such delay times as not to overlap with those for other terminals 131, 132, . . . , 13N to the wireless LAN terminals 131, 132, . . . , 13N in the form of an integral multiple of the time required to receive one packet from each of the terminals 131, 132, . . . , 13N and notifies the same to the wireless LAN terminals 131, 132, . . . , 13N as delay request information with being superimposed on the broadcast capsulated packets.

The terminals 131, 132, . . . , 13N having received the information set their own interval timers 301, 302, . . . , 30N to the times designated by the delay request information once at the time of their reception and return the interval timers 301, 302, . . . , 30N to the original period T after timeout. In FIG. 6, the interval timers 301, 302, . . . , 30N count their delay times 311, 312, . . . , 31N in response to delay requests and are restored to the period T after the transmission of the packets 321, 322, . . . , 32N by the terminals 131, 132, . . . , 13N has been performed in accordance with the timeout. At the next timeout, the terminals 131, 132, . . . , 13N transmit the packets 331, 332, . . . , 33N respectively. Since no delay request information is contained in the broadcast capsulated packet 330 sent from the base station 120 to the terminals 131, 132, . . . , 13N, the interval timers 301, 302, . . . , 30N of the terminals 131, 132, . . . , 13N respectively continue to tick the period T.

Thus, in the present embodiment, an effect can be obtained that since packet transmissions of the wireless LAN terminals 131, 132, . . . , 13N are arbitrated so as not to collide, it is possible to suppress the collision of the packets and improve the efficiency of transmission of the wireless LAN.

Fourth Embodiment

Figure 7:
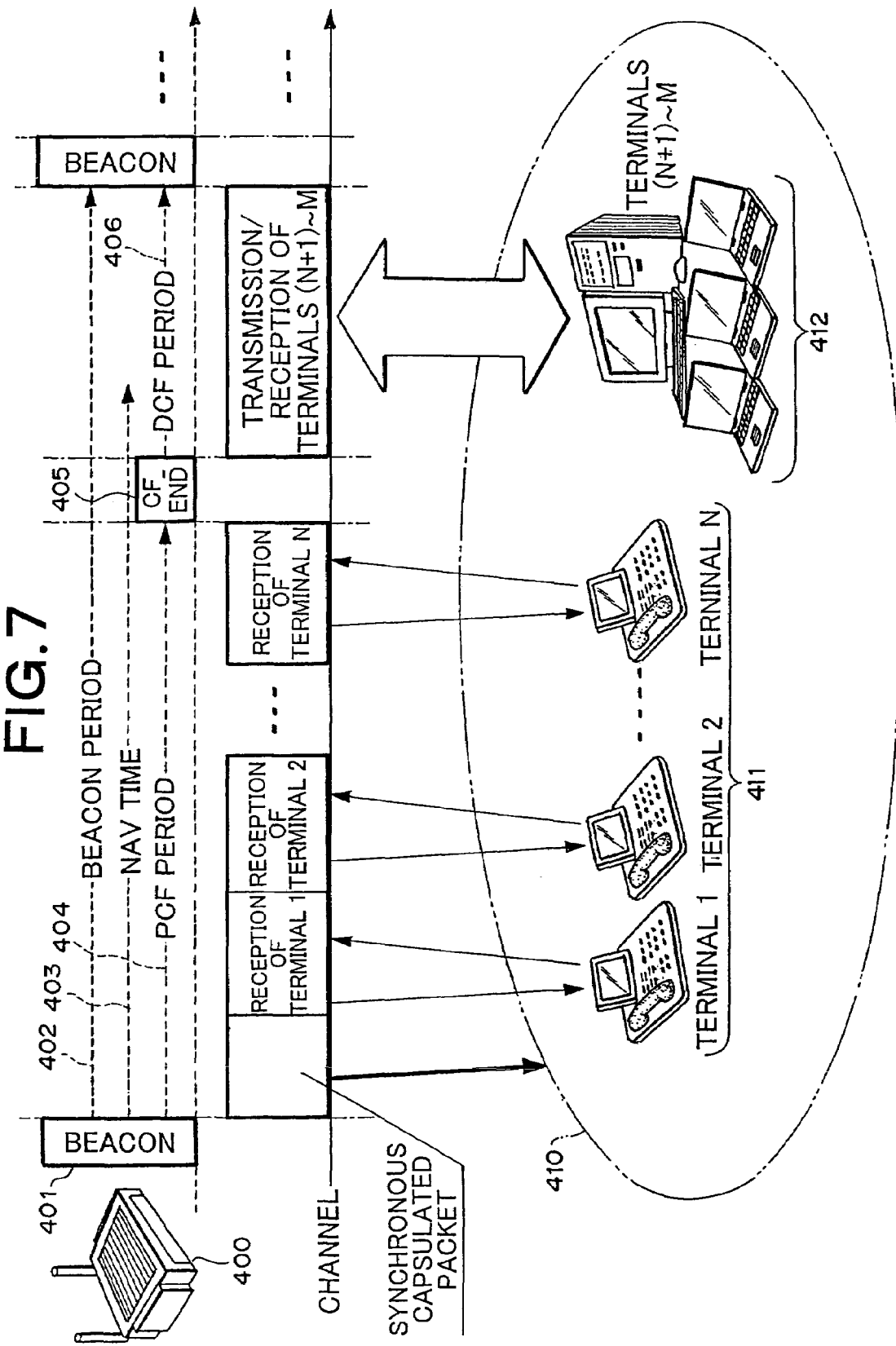
FIG. 7 is a configuration diagram depicting a fourth embodiment of the present invention.

A fourth embodiment of the present invention will next be explained. The fourth embodiment is contriving a PCF (Point Coordination Function) mode. FIG. 7 is a typical diagram thereof. Incidentally, a system configuration and configurations of a base station and wireless LAN terminals are basically similar to FIGS. 1 and 2.

In FIG. 7, a base station 400 performs channel control of a wireless LAN. In a manner similar to the base station 120 according to the first embodiment, the base station 400 has the function of sorting received packets into QoS packets and general packets, capsulating the QoS packets, and transmitting the so-capsulated packet in matching with the CODEC period. Each of radio beacons 401 periodically divides a radio channel. A periodic interval 402 is a periodic interval of the radio beacon 401. A NAV (Network location Vector) 403 notified to wireless LAN terminal groups 411 and 412 by the radio beacon 401 is equivalent to a reserved time from the radio beacon 401, which is taken to inhibit packet transmission of the terminal groups 411 (terminals 1, 2, . . . , N) and 412 (terminals (N+1) through M). Also a time 404 is equivalent to the time required to perform packet transmission under the PCF mode.

A CF_END signal 405 is a signal for notifying the completion of a PCF period to each terminal. A time 406 is equivalent to the time taken to perform packet transmission under the PCF mode. A cell 410 of the wireless LAN is an area where communications with the base station 400 are enabled. The wireless LAN terminal group 411 (terminals 1, 2, . . . , N) based on the PCF mode performs real time communication via the base station 400.

Further, the wireless LAN terminal group 412 (terminals (N+1) through M) is a wireless LAN terminal group based on a DCF (Distributed Coordination Function) mode. The base station 400 adjusts the beacon interval 402 to the period T, and sends out a broadcast capsulated packet in synchronism with it when the broadcast capsulated packet exists. Subsequently, the base station 400 sequentially transmits capsulated packets, general packets or unicast packets each indicative of an ACK request to the terminal group 411 based on the PCF mode every terminals.

The wireless LAN terminal group 411 based on the PCF mode and the wireless LAN terminal group 412 based on the DCF mode respectively have the function of sorting received packets into QoS packets and general packets in a manner similar to the wireless LAN terminals 131, 132, . . . , 13N employed in the first embodiment, capsulating the QoS packets, and transmitting the so-capsulated packet in matching with the CODEC period.

When one terminal of the terminal group 411 based on the PCF mode receives a unicast packet from the base station 400, it sends back an ACK packet. When a capsulated or general packet to be transmitted exists, the packet is transmitted in accordance with the corresponding ACK.

Thus, since the base station 400 sets the NAV time and allocates the transmission timings to the terminals based on the PCF mode in the present embodiment, there is no need to allow the terminals to have the interval timers for providing the timings taken to capsulate the packets, and the processing on the terminal side can be reduced. Further, since the transmission of the broadcast capsulated packet to the terminals can be performed in advance, it is possible to lighten a load from the reception of the packet from the base station to the sending back of ACK thereto. Incidentally, the PCF period may be constituted of an HCF period in the present configuration.

Fifth Embodiment

Figure 8:
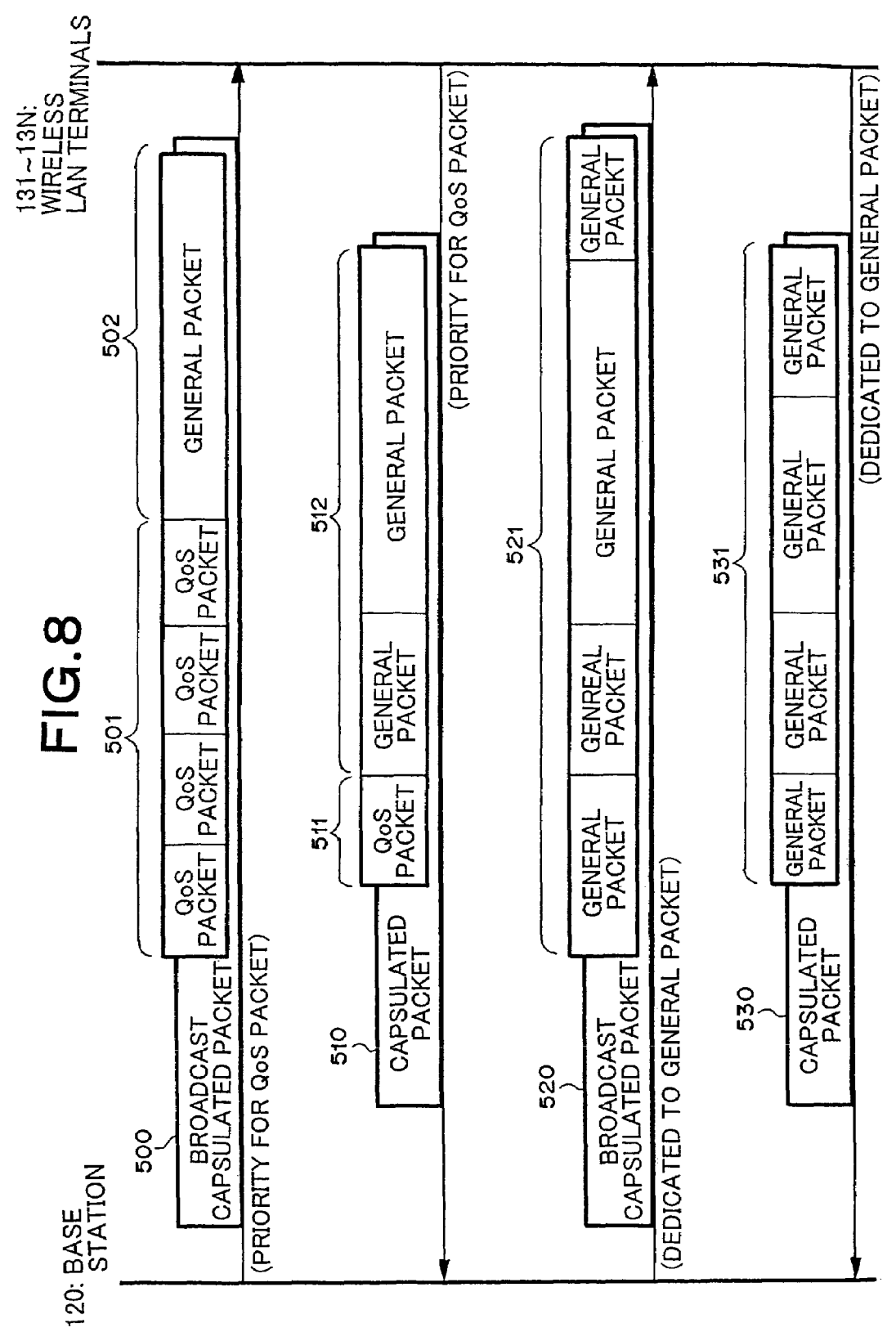

A fifth embodiment of the present invention will next be described. The fifth embodiment is designed so as to be able to ensure the transmission of general packets even when the number of QoS packets increases. FIG. 8 shows a typical diagram of a packet transmission sequence employed in the present embodiment. Incidentally, a system configuration and configurations of a base station and wireless LAN terminals both according to the fifth embodiment are similar to FIGS. 1 and 2 showing the first embodiment.

In FIG. 8, a broadcast capsulated packet 500 is such a broadcast capsulated packet sent from a base station 120 to wireless LAN terminals 131 through 13N that priorities are assigned to QoS packets. A payload of the broadcast capsulated packet 500 includes a section 501 consisting of QoS packets, and a section 502 consisting of a general packet.

A capsulated packet 510 is a QoS packet-prioritized capsulated packet sent from the wireless LAN terminals 131 through 13N to the base station 120. A payload of the capsulated packet 510 includes a section 511 consisting of a QoS packet, and a section 512 consisting of general packets. A capsulated packet 520 is a broadcast capsulated packet dedicated to general packets, which is sent from the base station 120 to the terminals 131 through 13N. A payload of the capsulated packet 520 is made up of a section 521 consisting of only general packets such as DATA packets.

A capsulated packet 530 is a capsulated packet dedicated to general packets, which is sent from the wireless LAN terminals 131 through 13N to the base station 120. A payload of the capsulated packet 530 is made up of a section 531 consisting of only general packets such as DATA packets.

Here, the base station 120 generates a capsulated packet with priority being assigned to QoS queues. Therefore, if the number of RTP sessions to which QoS is applied increases, then the QoS packet section 501 increases in the broadcast capsulated packet 500 and eventually the base station 120 is not able to create the general packet section 502. When the broadcast capsulated packet 500 is continuously transmitted, the RTP sessions are maintained but the transmission of general data is stopped. The capsulated packet 510 combined by the terminal side is also similar to the above.

In the present embodiment, as shown in FIG. 8, the capsulated packets dedicated to the general packets are respectively transmitted between the base station 120 and the wireless LAN terminals 131 through 13N while being interrupted between the QoS packet-prioritized capsulated packets. Incidentally, such packet transmission is performed by the wireless packet transmitters 208 and 227 in the base station and wireless LAN terminals of FIG. 2, for example. In the present embodiment as described above, real time communication can be optimized without impairing the normal use of the wireless LAN because the minimum transmission of the general packets can be ensured.

Sixth Embodiment

Figure 9:
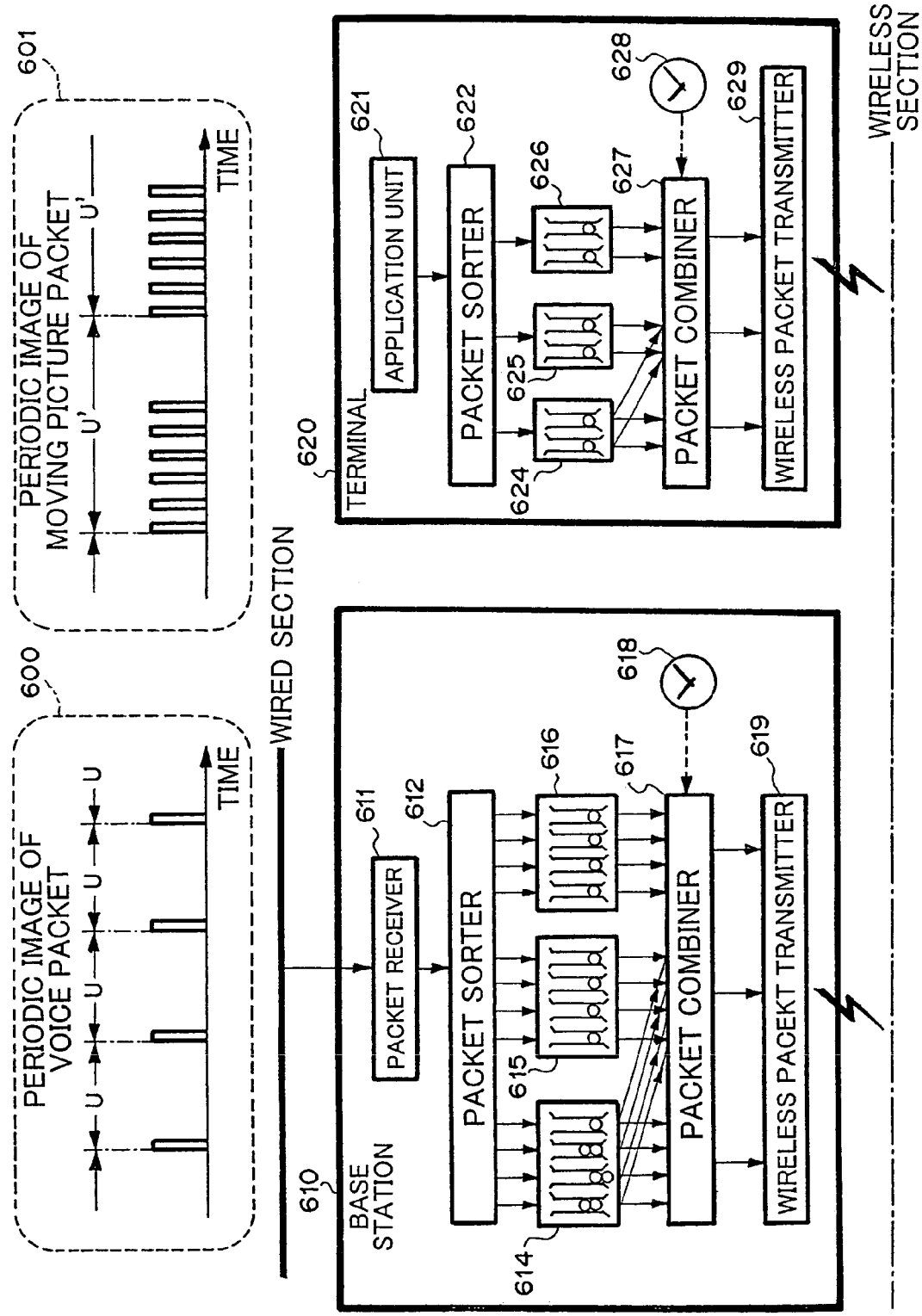
FIG. 9 is a configuration diagram illustrating a sixth embodiment of the present invention.

A sixth embodiment of the present invention will next be explained. The sixth embodiment is designed so as to be able to adapt to the type of RTP packet to which QoS is applied. Its configuration diagram is shown in FIG. 9. Incidentally, although a system configuration and configurations of a base station and wireless LAN terminals both according to the sixth embodiment are similar to the first embodiment, the present embodiment is different from the first embodiment in that QoS packets are further identified to be RTP packets of moving pictures and voice and then processed according to their identification.

In FIG. 9, a dotted-line section 600 is used to describe a period taken to generate each voice packet. As shown by the dotted-line section 600, a voice CODEC generally generates RTP packets one by one every predetermined periods U. A dotted-line section 601 is used to explain a period taken to generate each moving picture packet. As shown by the dotted-line section 601, a moving picture CODEC generally generates a plurality of RTP packets every predetermined periods U'.

A wireless LAN base station 610 makes a contrivance for voice/moving picture communications. A packet receiver 611 is a section for receiving packets from a network. A packet sorter 612 identifies general packets and QoS packets and further identifies the QoS packets to be RTP packets of moving pictures and voice. A method for sorting the packets by the packet sorter 612 will be described later.

A general queue 614 temporarily accumulates therein unprioritized general packets every destination MAC addresses or IP address ports. A moving picture queue 615 temporarily accumulates therein moving picture packets to which QoS is applied, every destination MAC addresses or IP address ports. A voice queue 616 temporarily accumulates therein voice packets to which QoS is applied, every destination MAC addresses or IP address ports.

A packet combiner 617 passes or combines the temporarily-accumulated packets according to a method to be described later. An interval timer 618 divides the period T equivalent to the greatest common factor of the voice packet periods U and moving picture packet periods U' and supplies timing provided for packet combination to the packet combiner 617. A wireless packet transmitter 619 sends out the packets passed or transmitted through the packet combiner 617 or the packet combined by the packet combiner 617 to a wireless LAN along a period T.

A wireless LAN terminal 620 makes a contrivance for voice/moving picture communications. An application unit 621 includes voice and moving picture CODECs and performs real time communication such as a videophone. A packet sorter 622 identifies general packets and QoS packets and further identifies the QoS packets to be moving picture and voice RTP packets. The packet sorter 622 performs packet sorting in a manner similar to the packet sorter 612 on the base station 610 side.

A general queue 624 temporarily accumulates unprioritized general packets every destination IP address ports. A moving picture queue 625 temporarily accumulates moving picture packets to which QoS is applied, every destination IP address ports.

A voice queue 626 temporarily accumulates voice packets to which QoS is applied, every destination IP address ports. A packet combiner 627 passes or combines the temporarily-accumulated packets according to a method to be described later. An interval timer 628 divides a period T equivalent to the greatest common factor of the voice packet periods U and moving picture packet periods U' and supplies timing provided for packet combination to the packet combiner 627.

A wireless packet transmitter 629 sends out the packets passed or transmitted through the packet combiner 627 or the packet combined thereby to the wireless LAN along a period T. Here, the voice and moving pictures differ according to how to see the periods even in the case of the RTP packets as understood from the voice packet generation period 600 and moving pictures packet generation period 601. In the case of the voice of the RTP packets that arrive at the packet sorters 612 and 622, the voice packets arrive at predetermined intervals, but in the case of the moving pictures thereof, a series of RTP packets arrive at intermittent intervals.

In general, the period U' for the moving picture packet is longer than the period U for the voice packet. In the present embodiment, the QoS queues are sorted into the voice and moving pictures, which are processed according to different methods. When the voice packets first arrive at the packet sorter 612 in the base station 610, the packet sorter 612 temporarily accumulates the voice packets in queue buffers set every destinations in the voice queue 616. Next, when the timing provided to send out each voice queue is issued from the interval timer 618, the packet combiner 617 combines the voice queues for all destinations into one broadcast capsulated packet and sends out it therefrom.

Next, when the moving picture packets arrive at the packet sorter 612, the packet sorter 612 temporarily accumulates the moving picture packets in queue buffers set every destinations in the moving picture queue 615. The packet sorter 612 has already measured, every queue buffers in the moving picture queue 615, time intervals that have elapsed since the moving picture packets have been accumulated at the last. When a time interval of a predetermined value or more has elapsed, a dummy queue used as a mark is introduced into its corresponding queue buffer. The dummy buffer is used to recognize the last moving picture packet when the moving picture packets are read from the queue buffers.

When the timing provided to send out each moving picture queue is given from the interval timer 618, the packet combiner 617 reads the moving picture packets from the moving picture queue 615 every destinations. At this time, the packet combiner 617 skips reading over the queue buffers at the destinations where no dummy queues are accumulated. When the packet combiner 617 finds out a dummy packet when it is reading the moving picture packets with respect to one destination, it performs the reading of the motion picture packets for the destination till its discovery, and discards their dummy queues and combines the read moving picture packets into a capsulated packet.

However, when the moving picture packets would overflow a payload of one capsulated packet, they are divided into a plurality of capsulated packets. When allowance is made for the payload of the capsulated packet, the packet combiner 617 may read and add packageable ones of the general packets for the same destination in the general queue 614. The wireless LAN terminal 620 also results in the flow of processing similar to the base station 610.

Here, the packet sorters 612 and 622 are similar in packet sorting method to FIGS. 3 and 4 illustrative of the first embodiment. While the moving picture packets and voice packets are not sorted in the first embodiment, the present embodiment performs a process in which in the process of FIG. 3, the pattern matching process for the RTP packets is performed at Step S303 (Step S404 in FIG. 4) after the processes of Steps S301 and S302, and the prioritized QoS packets are further sorted into moving pictures and voice packets.

Described specifically, the packet sorter refers to headers (patterns for a layer 5 and above) of received packets at Step S303 (Step S404 in FIG. 4) in FIG. 3 and check them against the patterns of the RTP packets registered in the QoS setting table 302, thereby further sorting prioritized packets into moving picture packets and voice packets. The present embodiment is similar in other processing to the first embodiment.

In the present embodiment in this manner, the transmission capability of the wireless LAN can be enhanced, and the packets are handled according to the types of voice and moving pictures. It is therefore possible to enhance simultaneous communication capability for real time communication such as a videophone, a television conference that makes use of a wireless LAN, and optimize communication quality.

Seventh Embodiment

Figure 10:
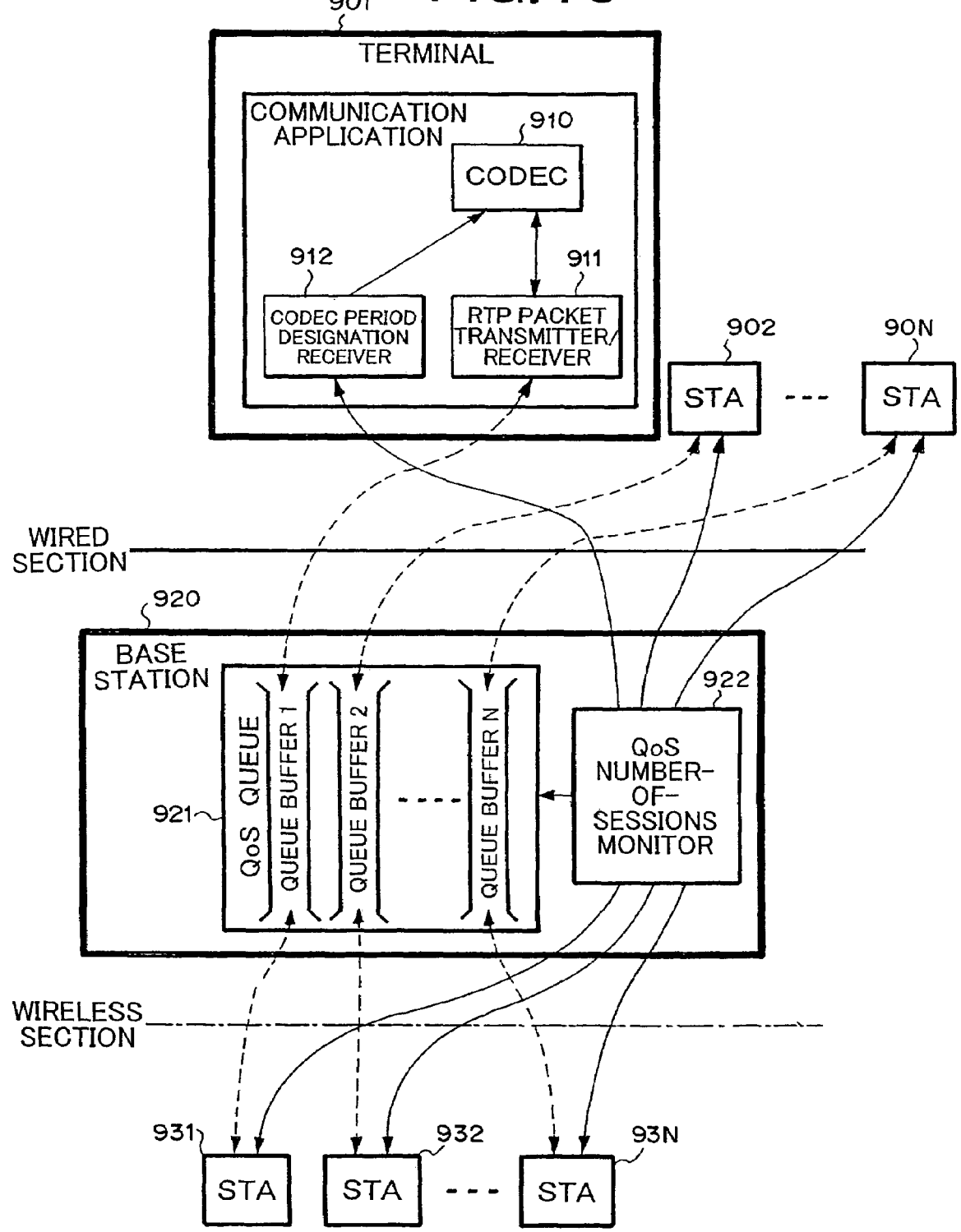
FIG. 10 is a configuration diagram depicting a seventh embodiment of the present invention.

A seventh embodiment of the present invention will next be explained. In the seventh embodiment, the period of the CODEC is adjusted according to the number of RTP sessions with which a base station is concerned. A configuration diagram thereof is shown in FIG. 10. Incidentally, a system configuration and configurations of the base station and wireless LAN terminals are basically similar to FIGS. 1 and 2 illustrative of the first embodiment.

In FIG. 10, terminals 901, 902, . . . , 90N on the network side perform real time communication with wireless LAN terminals 931, 932, . . . , 93N through a network such as Internet, a LAN with a base station 920 interposed therebetween. While major structure elements are shown in the terminals 901, they are common to other terminals 902 through 90N and wireless LAN terminals 931, 932, . . . , 93N. Incidentally, the terminals 901, 902, . . . , 90N correspond to the terminals 101, 102, . . . , 10N of FIG. 1, the base station 920 corresponds to the base station 120 of FIG. 1, and the wireless LAN terminals 931, 932, . . . , 93N correspond to the wireless LAN terminals 131, 132, . . . , 13N of FIG. 1, respectively. The network 110 of FIG. 1 is not shown in the drawing. The wireless LAN terminals 931, 932, . . . , 93N in FIG. 10 respectively have functions equivalent to the wireless LAN terminals 131, 132, . . . , 13N according to the first embodiment.

A CODEC 910 in the terminal 901 has an AD (Analog to Digital) conversion function for digitizing an analog signal to generate/compress a periodic digital signal, and a DA (Digital to Analog) conversion function for decompressing/uncompressing the digital signal to take out the analog signal. An RTP packet transmitter/receiver 911 in the terminal 901 has the function of generating/transmitting an RTP packet from the signal generated by the CODEC with a payload as the base, and the function of transmitting the received/decoded signal to the CODEC. A CODEC period designation receiver 912 in the terminal 901 receives therein a CODEC period designation received from the base station 920 and makes a period change to the CODEC. A QoS queue 921 and a QoS number-of-sessions monitor 922 in the base station 920 are major components. Of course, the base station 920 has a function equivalent to the base station 120 shown in FIG. 1.

The QoS queue 921 in the base station 920 is provided in accordance with RTP sessions and temporarily accumulates the RTP packets therein. The QoS number-of-sessions monitor 922 in the base station 920 monitors the number of the RTP sessions, generates a signal for extending the period of CODEC when the number of the RTP sessions has reached a predetermined value or more, and shortening the period thereof when it has reached the predetermined value or less, and notifies the RTP sessions to the CODEC period designation receivers 912 of all the terminated applications. An SNMP or RTCP may be used in this notification.

In the present embodiment, the QoS number-of-sessions monitor 922 monitors the number of the RTP sessions, and the CODEC period designation receiver 912 receives therein the CODEC period designation received from the base station 920 to thereby make the period change to the CODEC. Therefore, when the number of sessions in the real time communication through the base station 920 increases, the period of the CODEC is extended to enable suppression of the frequency of occurrence of the RTP packets and to make it possible to lessen a problem that due to the difference in throughput between a wired LAN and a wireless LAN, packets are congested at a bridge section of the base station 920 so that the quality of voice and moving pictures is degraded.

Eighth Embodiment

Figure 11:
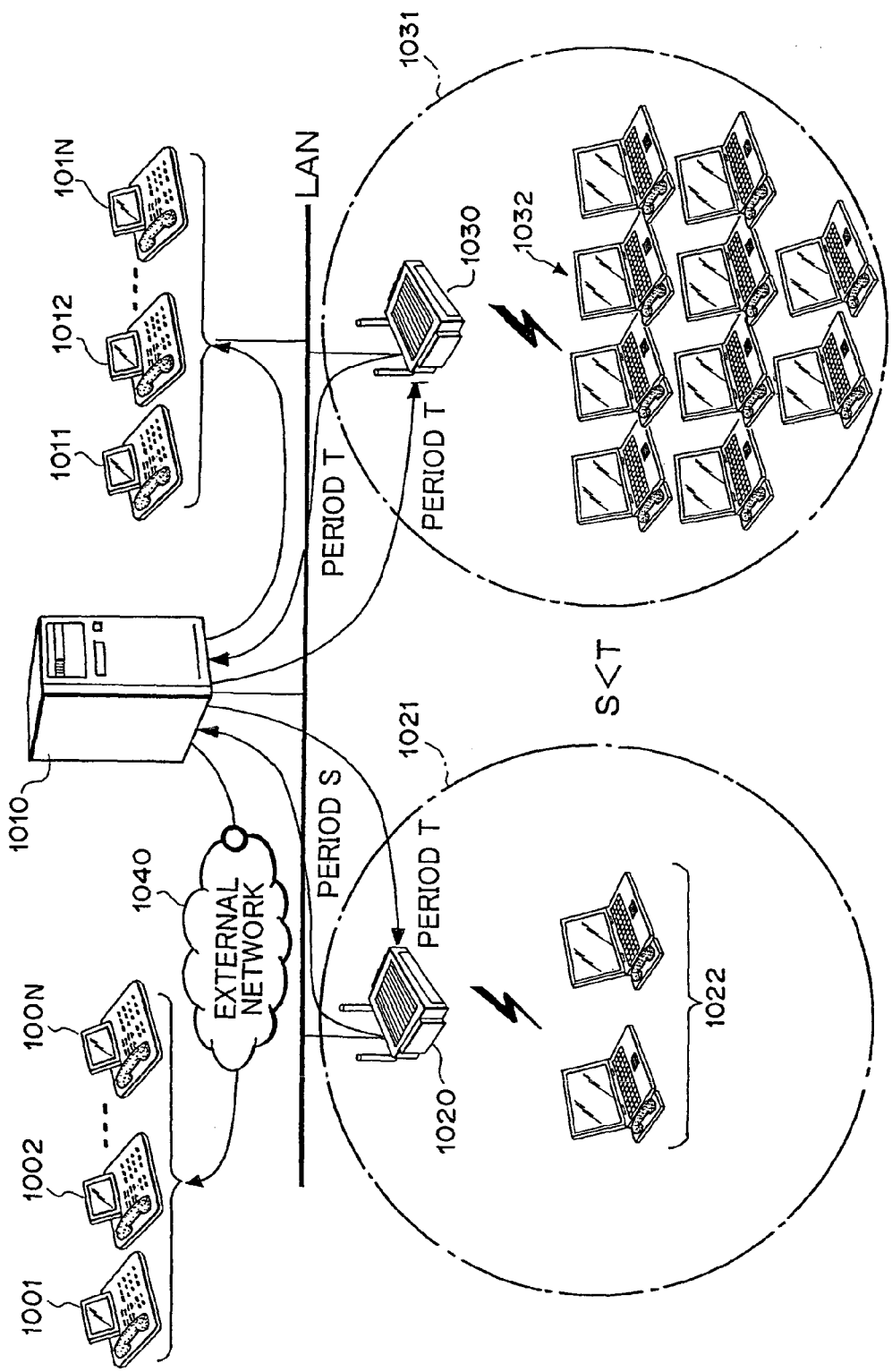
FIG. 11 is a configuration diagram showing an eighth embodiment of the present invention.

An eighth embodiment of the present invention will next be explained. In the eighth embodiment, the period of the CODEC is dynamically changed in an IP conversion section or exchanger. A configuration diagram thereof is shown in FIG. 11. Incidentally, a system configuration and configurations of a base station and wireless LAN terminals are basically similar to the first embodiment.

In FIG. 11, external network terminals 1001, 1002, ..., 100N such as Internet appliances respectively have CODECs associated with the present system and perform real time communication such as a VoIP (IP phone) or the like. An IP exchanger 1010 performs a process for switching to real time communication to which the present system relates. An external network 1040 connects between the external network terminals 1001, 1002, ..., 100N and the IP exchanger 1010.

LAN terminals 1011, 1012, ..., 101N respectively have CODECs associated with the present system and perform real time communication. Wireless LAN base stations 1020 and 1030 respectively constitute cells 1021 and 1031. Wireless LAN terminals 1022 and 1032 respectively accommodated in the cells 1021 and 1031 respectively have CODECs associated with the present system and perform real time communication.

Assuming now that the minimum periods to be expected for the CODECs are respectively defined as S and T, the relation of S<T is established because a small number of the terminals 1022 are communicating in the case of the cell 1021, and a large number of the terminals 1032 are in communication in the case of the cell 1031 although the respective wireless LAN terminals 1022 and 1032 are performing real time communication. The base station 1020 and the base station 1030 respectively notify the CODEC minimum periods S and T to the IP exchanger 1010. The IP exchanger 1010 receives CODEC minimum periods from all of the accommodated wireless LAN base stations 1020 and 1030, applies the longest period thereof (see T in the drawing) and requests all the terminals 1022 and 1032 to change the periods of their CODECs.

In the present embodiment, each of the terminals 1022 and 1032 is able to determine the CODEC period to be adopted even in the case of the system in which a plurality of the wireless LAN base stations 1020 and 1030 have been accommodated. Incidentally, the present embodiment is exactly similar to the first embodiment except for a dynamic change in CODEC period.

Ninth Embodiment

Figure 12:
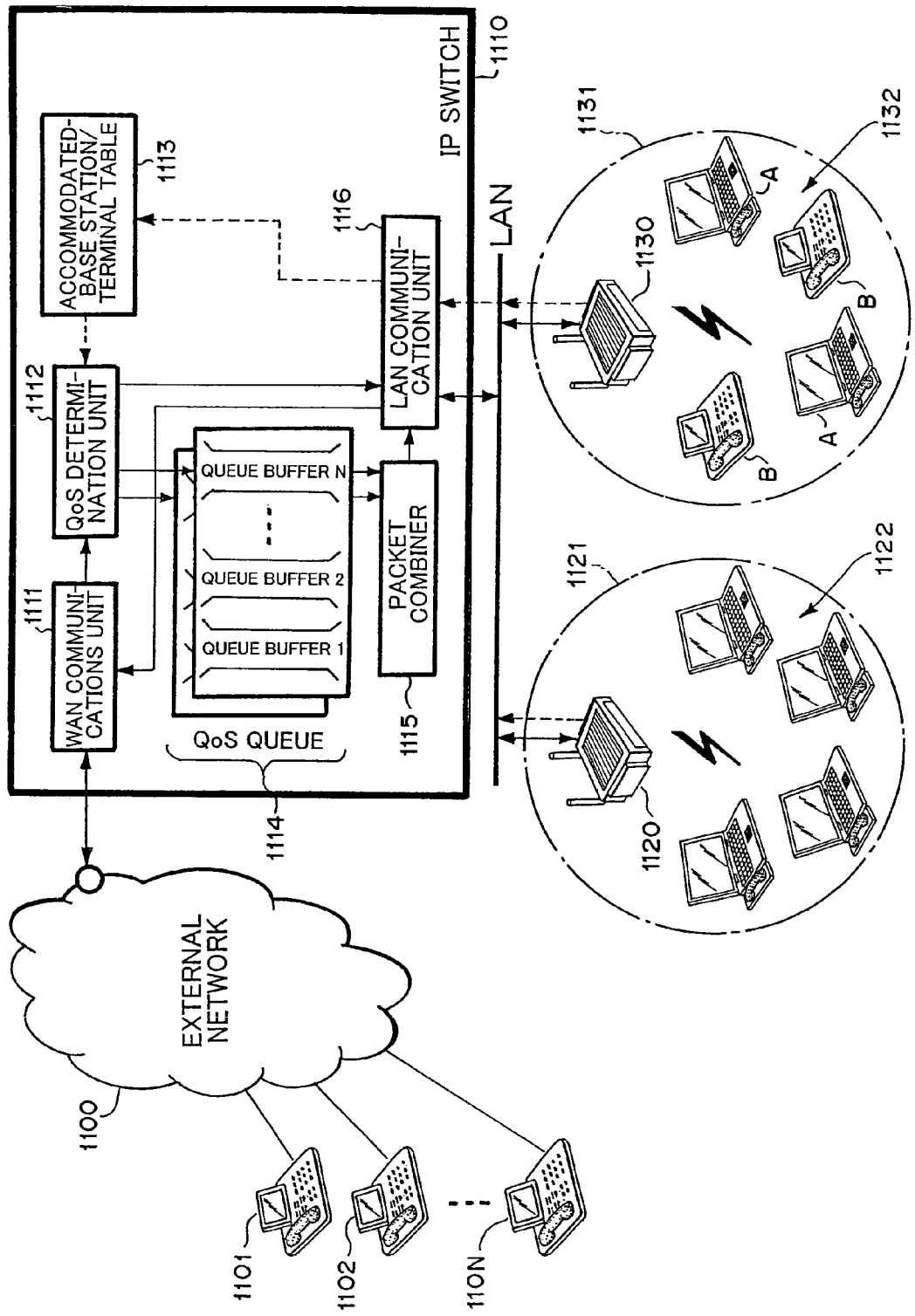
FIG. 12 is a configuration diagram illustrating a ninth embodiment of the present invention.

A ninth embodiment of the present invention will next be described. In the ninth embodiment, RTP packets are combined together by an IP switch to suppress the number of packets. FIG. 12 shows its configuration. Incidentally, although a system configuration and configurations of wireless LAN terminals are basically similar to the first embodiment, an IP exchanger in the present embodiment has a function equal to the base station of the first embodiment.

In FIG. 12, terminals 1101, 1102, ..., 110N perform real time communication with a system through an external network 1100 such as Internet. A WAN communications unit 1111 in the IP exchanger (IP switch) of the present system serves as the medium of communications with the external network 1100. A QoS determination unit 1112 extracts RTP packets from packets received by the WAN communications unit 1111 and sorts them into their corresponding QoS queues set every wireless LAN base stations 1120 and 1130 accommodated in the present system.

The QoS determination unit 1112 refers to a table 1113 recording the types of the terminals 1122 and 1132 connected to the wireless LAN base stations 1120 and 1130 accommodated in the present system upon sorting the packets into the QoS queues 1114 set every base stations 1120 and 1130. The QoS queues 1114 set every wireless LAN base stations 1120 and 1130 accommodated in the system can be provided in plural form.

A packet combiner 1115 is able to generate capsulated packets every base stations 1120 and 1130 held in the system from the QoS queues 1114. A LAN communications unit 1116 has the function of controlling communications between the same LAN communications unit and the wireless LAN base stations 1120 and 1130 through a LAN. Incidentally, although not shown in FIG. 12, the IP exchanger 1110 has the function of transmitting the capsulated packets in matching with the CODEC period in a manner similar to the first embodiment.

The wireless LAN base stations 1120 and 1130 respectively form cells 1121 and 1131. Only the terminals 1122 corresponding to the capsulated packets of the present system are connected to the cell 1121. The terminals 1132 unassociated with the capsulated packets of the present system exist in the cell 1131 in mixed form. That is, all of the terminals 1122 in the cell 1121 respectively have functions equivalent to the wireless LAN terminals 131, 132, ..., 13N of the first embodiment. The terminals 1132 in the cell 1131 include, in mixed form, terminals A that respectively have functions equivalent to the wireless LAN terminals 131, 132, ..., 13N of the first embodiment, and terminals B having no such functions.

The base station 1120 notifies all of IP addresses of the connected terminals 1122 being in correspondence with the capsulated packets of the present system, to the accommodated-base station/terminal table 1113. When the QoS determination unit 1112 receives packets for the terminals 1122 in the cell 1121, it sorts the extracted RTP packets into the QoS queues 1114, and the corresponding packets are combined together by the packet combiner 1115, which in turn is unicasted to the base station 1120.

The base station 1120 allows the capsulated packet to pass through each connection terminal 1122. The connection terminal 1122 judges the capsulated packet to start operating. On the other hand, the base station 1130 notifies, to the accommodated-base station/terminal table 1113, a decision as to whether IP addresses of the terminals 1132 correspond to the capsulated packets of the present system. The QoS determination unit 1112 judges into which QoS queue 1114 the received packets should be sorted with the information of the table 1113 as the base. When, in this case, the received packets are found to be packets intended for the terminals B, which do not correspond to the capsulated packets of the present system, the QoS determination unit 1112 transmits the received packets to the LAN communications unit 1116 as they are.

Thus, the IP exchanger 1110 combines the RTP packets to allow the number of the packets to be suppressed from the level of the wired LAN. It is therefore possible to lighten the loads on the wireless LAN base stations 1120 and 1130 and reduce congestion of the packets, which could happen at bridge portions of the base stations 1120 and 1130 due to the difference between the wired and wireless transmission rates.

Tenth Embodiment

Figure 13:
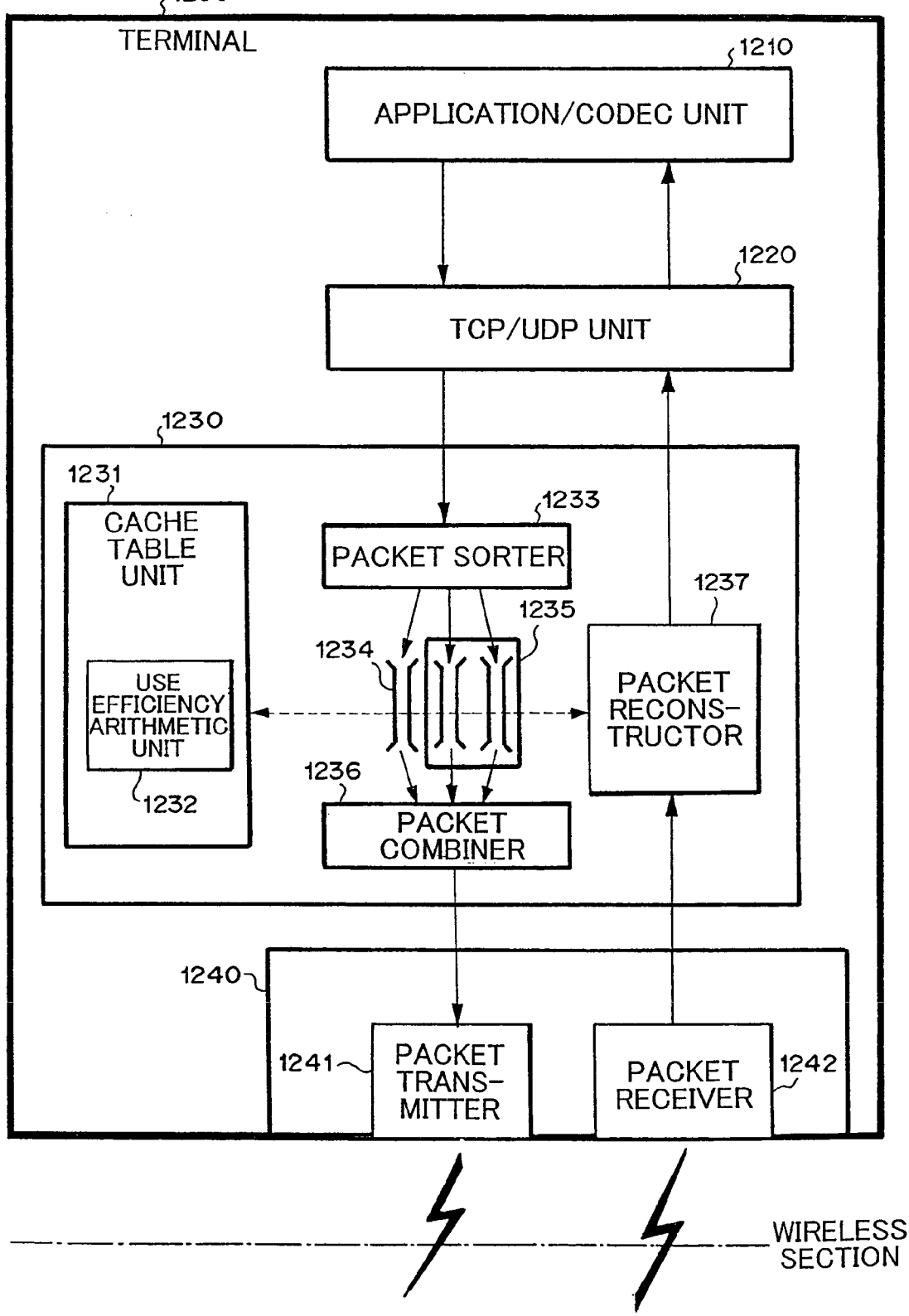
FIG. 13 is a configuration diagram depicting a tenth embodiment of the present invention.
Figure 14:
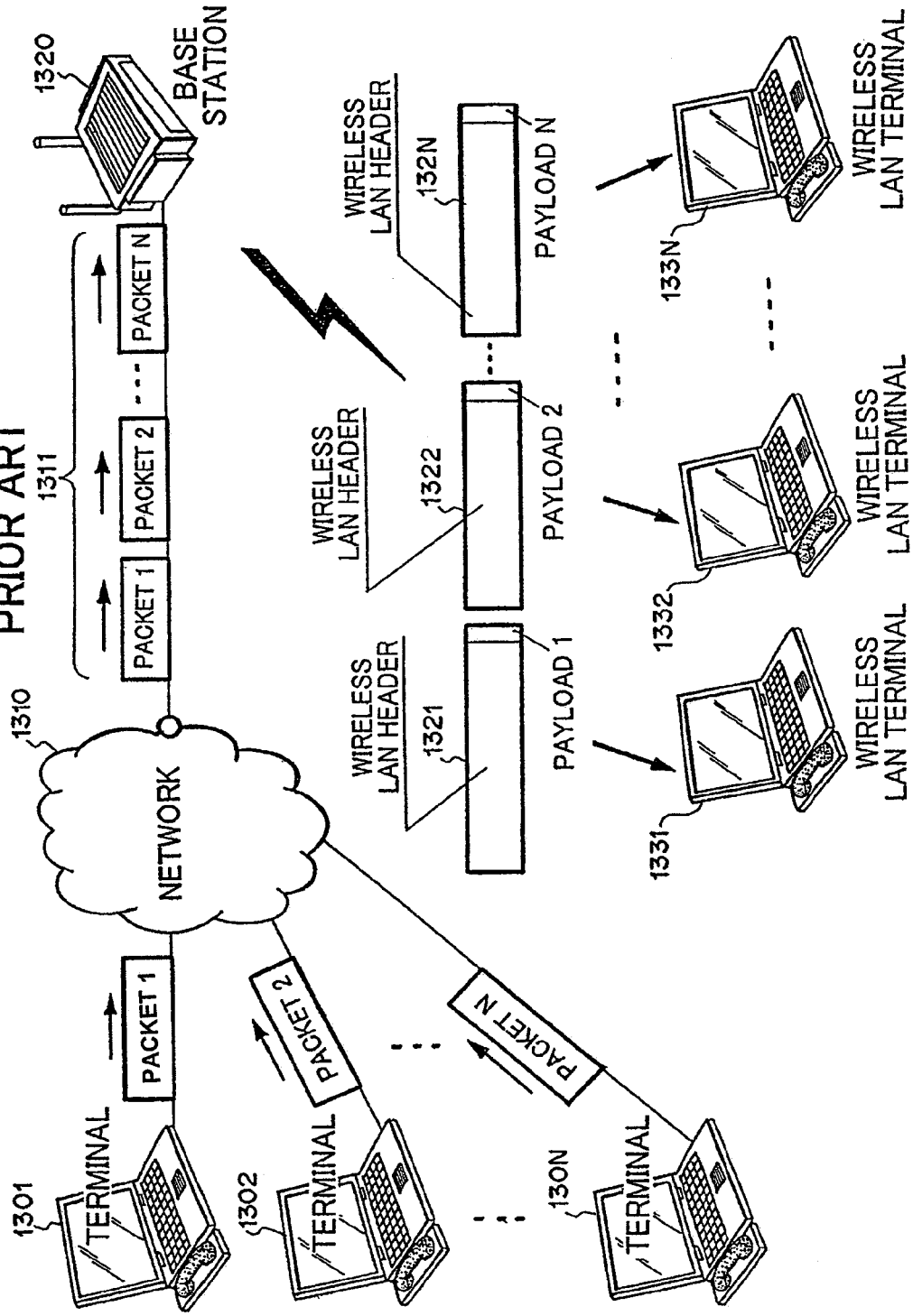
FIG. 14 is a configuration diagram showing a wireless LAN system according to a prior art example.

A tenth embodiment of the present invention will next be explained. In the tenth embodiment, the transmission of each TCP packet is optimized on a stable basis. FIG. 13 is a configuration diagram thereof. Incidentally, although the configurations of a system and a base station according to the present embodiment are similar to the first embodiment, each wireless LAN terminal according to the present embodiment has, as will be described later, the function of suppressing retention of RTP packets in the system in addition to the function of capsulating prioritized packets and the function of transmitting the capsulated packet in matching with a CODEC period, both of which are similar to the first embodiment.

In a wireless LAN terminal 1200 shown in FIG. 13, which is associated with the present system, an application/CODEC unit 1210 has the CODEC section and is capable of real time communication. A TCP/UDP unit 1220 controls a transport layer of an OSI reference model in IP communication. An implement unit 1230 employed in the present embodiment performs queuing and combining of QoS packets.

A cache table unit 1231 refers to each transmitted/received TCP packet and a header of its ACK and refers to the difference between the transmit time of the TCP packet and the receive time of the ACK. A use efficiency arithmetic unit 1232 for computing the use efficiency of a general queue 1234 is located in the cache table unit 1231 and calculates RTT (Round Tr IP Time) according to an independent method of the present system. A packet sorter 1233 sorts the packets supplied from the TCP/UDP unit 1220 into the general queue 1234 and one or plural QoS queues 1235. A packet combiner 1236 combines the packets read from the general queue 1234 and the QoS queue 1235 to generate a capsulated packet.

A packet reconstructor 1237 allows a received packet to pass therethrough if it is normal, and extracts a normal packet if it is a capsulated packet. In a wireless packet transmitter/receiver 1240, a packet transmitter 1241 transmits the packet supplied from the packet combiner 1236 to a wireless LAN, and a packet receiver 1242 supplies a packet received from the wireless LAN to the packet reconstructor 1237.

Since the TCP packets are temporarily accumulated in the general queue 1234 in principle here, the timing provided to send out each TCP packet is operated so that a variation in RTT increases. It is normally known to implement RTT as the following expression (2). It is however considered that if it is adopted as it is, then the way of RTT being scaled increases, so that the retention of packets occurs in a portion where the packets are supplied from the TCP/UDP unit 1220 to the packet sorter 1233 and the capturing of RTP packets from the packet sorter 1233 to the QoS queue 1235 is delayed, thereby exerting an adverse effect on communication quality.

$$RTT = (\alpha \times 01d\_RTT) + ((1-\alpha) \times New\_Round\_Time\_Sample) \quad (2)$$

$$0 \leq \alpha < 1$$

In the present embodiment, an expression (3) shown below is used. Here, 01d_RTT in the expression (3) indicates a RTT value up to date, New_Round_Time_Sample indicates the time from the transmission of the latest TCP packet to the reception of an ACK, and K and $\alpha$ indicate coefficients, respectively. The speed for reading each packet from the TCP/UDP unit 1220 is normally controlled in accordance with the RTT value. When the expression (2) is used, such a problem as mentioned above arises.

In the present embodiment, firstly, K in the expression (3) is set to K<1 when the general queue 1234 is in an empty state, the follow-on TCP packets are extracted earlier than the ideal value, and the general queue 1234 is made it easy to retain the TCP packets. Thereafter, when the general queue 1234 has accumulated or retained the TCP packets a predetermined value or more, K is set as K=1, whereas when the general queue 1234 has dropped below the predetermined value, K is set as K<1. By controlling the value of K in the expression (3) in accordance with the state of the general queue 1234 in this way, RTT gradually approaches the optimum value relatively smoothly when the general queue 1234 starts to be supplied with the TCP packets from the empty state. It is therefore possible to suppress the retention of the RTP packets in the TCP/UDP unit 1220 and stabilize communication quality.

$$RTT = (\alpha \times K \times 01d\_RTT) + ((1-\alpha) \times New\_Round\_Time\_Sample) \quad (3)$$

$$0 \leq \alpha < 1$$
$$0 < K \leq 1$$

According to the present invention as described above, received packets are sorted into prioritized packets and packets other than them to make it possible to transmit RTP packets on a priority basis. Further, the prioritized packets are capsulated and the so-capsulated packet is transmitted in matching with a CODEC period, thereby making it possible to enhance the transmission efficiency of packets on a wireless LAN and ensure the quality of real time communication on the wireless LAN.

While the present invention has been described with reference to the illustrative embodiments, this description is not intended to be construed in a limiting sense. Various modifications of the illustrative embodiments, as well as other embodiments of the invention, will be apparent to those skilled in the art on reference to this description. It is therefore contemplated that the appended claims will cover any such modifications or embodiments as fall within the true scope of the invention.

What is claimed is:

1. A wireless LAN system comprising:
   at least one base station;
   at least one wireless LAN terminal connected to said base station via a wireless LAN; and
   a packet transmission system for transmitting a packet between said base station and said at least one wireless LAN terminal via the wireless LAN, said packet transmission system comprising:
   sorting means for sorting received packets into prioritized packets and non-prioritized packets;
   accumulating means for accumulating the prioritized packets sorted by said sorting means;

capsulating means for capsulating at least one of the packets accumulated in said accumulating means into at least one capsulated packet; and transmitting means for transmitting said capsulated packet capsulated by said capsulating means.

2. The wireless LAN system according to claim 1, wherein said packet transmission system further comprises arbitrating means for transmitting delay request information for delaying transmission of packets from said base station to said wireless LAN terminal such that the packet transmission does not overlap with other terminals, thereby arbitrating transmission of packets from said wireless LAN terminal to said base station so as not to cause a collision thereof.

3. The wireless LAN system according to claim 1, wherein said wireless LAN terminal is associated with a PCF mode, and said base station sets a NAY time and gives timing provided to transmit said capsulated packet, to said wireless LAN terminal.

4. The wireless LAN system according to claim 1, wherein said packet transmission system further comprises means for adjusting a period for transmitting said capsulated packet according to a number of real time sessions active via said base station.

5. The wireless LAN system according to claim 1, wherein said packet transmission system further comprises means for collecting CODEC minimal periods corresponding to all of said at least one wireless LAN terminal connected to each of said at least one base station and setting the longest of said CODEC minimal periods of all of said at least one wireless terminal connected to each respective base station as a transmission period of each capsulated packet for said respective base station.

6. The wireless LAN system according to claim 1, further comprising:

an IP exchanger having said packet transmission system;

a table in which IP addresses of the at least one wireless ALN terminal connected to every said at least one base station and information indicative of whether said at least one wireless LAN terminal is able to receive capsulated packets are registered; and means for performing control for allowing said IP exchanger to capsulate prioritized packets based on the information registered in said table and causing said IP exchanger to transmit said capsulated packet, if transmission destination IP addresses of received packets respectively correspond to the IP addresses of said at least one wireless LAN terminal and said at least one wireless LAN terminal is able to receive said capsulated packets, and allowing said IP exchanger to transmit the received packets to said at least one base station without encapsulation if said at least one wireless LAN terminal is not able to receive said capsulated packets.

7. The wireless LAN system according to claim 1, wherein said packet transmission system further comprises:

arithmetic means for computing use efficiency of a general queue for accumulating the non-prioritized packets, using a predetermined arithmetic expression; and control means for changing coefficients of the arithmetic expression according to a state of accumulation of the general queue, thereby controlling a value of the use efficiency computed by said arithmetic means.

8. The wireless LAN system according to claim 7, wherein said predetermined arithmetic expression is represented as follows:

$$RTT = (\alpha \times K \times 01d\_RTT) + ((1-\alpha) \times New\_Round\_Time\_Sample)$$

$$0 \leq \alpha < 1, 0 < K \leq 1$$

where 01d_RTT indicates an RTT value up to date New_Round_Time_Sample indicates the time from the transmission of a latest TCP packet to a reception of an ACK, and K and α indicate coefficients, and said control means changes the value of the coefficient K according to the state of accumulation of the general queue.

9. A packet transmission system comprising:

sorting means for sorting received packets into prioritized packets and non-prioritized packets;

accumulating means for accumulating the prioritized packets sorted by said sorting means;

capsulating means for capsulating the packets accumulated in said accumulating means; and transmitting means for transmitting the packet capsulated by said capsulating means, wherein said transmitting means transmits the capsulated packet in matching with a CODEC period, the transmitting means transmitting the capsulated packet in a period T that satisfies $d \leq T \leq C$ where the CODEC period is C and the minimum period necessary for a terminal reception is d.

10. A base station including a packet transmission system which comprises:

sorting means for sorting received packets into prioritized packets and packets other than the prioritized packets;

accumulating means for accumulating the prioritized packets sorted by said sorting means;

capsulating means for capsulating more than one of the packets accumulated in said accumulating means into one capsulated packet; and transmitting means for transmitting said capsulated packet capsulated by said capsulating means.

11. A wireless LAN terminal including a packet transmission system which comprises:

sorting means for sorting received packets into prioritized packets and packets other than the prioritized packets;

accumulating means for accumulating the prioritized packets sorted by said sorting means;

capsulating means for capsulating more than one of the packets accumulated in said accumulating means into one capsulated packet; and transmitting means for transmitting said capsulated packet capsulated by said capsulating means.

12. The wireless LAN terminal according to claim 11, wherein said sorting means further sorts the prioritized packets into moving pictures and voice packets.

13. The wireless LAN terminal according to claim 11, wherein only when the received packets are UDP and IP ports coincide with IP ports registered in advance respectively, said sorting means sorts the received packets into the prioritized packets.

14. The wireless LAN terminal according to claim 11, wherein said sorting means sets queues to general packets other than the prioritized packets every MAC addresses.

15. The wireless LAN terminal according to claim 11, wherein said transmitting means transmits prioritized capsulated packets with general packets being respectively interrupted between the prioritized capsulated packets.

16. A packet transmission system comprising:
sorting means for sorting received packets into prioritized packets and packets other than the prioritized packets;
accumulating means for accumulating the prioritized packets sorted by said sorting means;
capsulating means for capsulating more than one of the packets accumulated in said accumulating means into one capsulated packet; and
transmitting means for transmitting said capsulated packet capsulated by said capsulating means.

17. The packet transmission system according to claim 16, wherein said transmitting means transmits said capsulated packet in matching with a CODEC period.

18. The packet transmission system according to claim 16, wherein said sorting means further sorts the prioritized packets into moving picture packets and voice packets, and said capsulating means capsulates the prioritized packets into moving picture capsulated packets and voice capsulated packets.

19. The packet transmission system according to claim 16, wherein only when the received packets are UDP and IP ports coincide with IP ports registered in advance respectively, said sorting means sorts the received packets into the prioritized packets.

20. The packet transmission system according to claim 16, wherein said sorting means sorts general packets, which are packets other than the prioritized packets, into queues for each MAC address.

21. The packet transmission system according to claim 16, wherein the capsulated packet transmission period of said transmitting means is counted by an interval timer.

22. The packet transmission system according to claim 16, wherein said transmitting means the prioritized capsulated packets with general packets being respectively interrupted between the prioritized capsulated packets.

23. A packet transmission method performed by a base station, performed by a base station, comprising the steps of:
sorting received packets into prioritized packets and packets other than the prioritized packets;
accumulating the sorted prioritized packets;
capsulating more than one of the accumulated packets into one capsulated packet; and
transmitting said capsulated packet, wherein the sorting, the accumulating, the capsulating and the transmitting steps are performed by the base station, wherein the sorting, accumulating, copulating and transmitting steps are performed by the base station.

24. A wireless LAN system comprising:
at least one base station;
at least one wireless LAN terminal connected to said base station via a wireless LAN; and
a packet transmission system for transmitting a packet between said base station and said at least one wireless LAN terminal via the wireless LAN, said packet transmission system comprising:
sorting means for sorting received packets into prioritized packets and non-prioritized packets;
accumulating means for accumulating the prioritized packets sorted by said sorting means;
capsulating means for capsulating more than one of the packets accumulated in said accumulating means into one capsulated packet; and
transmitting means for transmitting said capsulated packet capsulated by said capsulating means.

25. A packet transmission method performed by a wireless terminal, comprising the steps of:
sorting received packets into prioritized packets and packets other than the prioritized packets;
accumulating the sorted prioritized packets;
capsulating more than one of the accumulated packets into one capsulated packet; and
transmitting said capsulated packet, wherein the sorting, accumulating, copulating and transmitting steps are performed by the wireless terminal.

* * * * *